(12) United States Patent
Zeng et al.

(10) Patent No.: US 12,204,981 B2
(45) Date of Patent: Jan. 21, 2025

(54) RADIO-FREQUENCY IDENTIFICATION (RFID) PRINTER WITH A ROTATABLE ANTENNA BRACKET COMPONENT

(71) Applicant: Hand Held Products, Inc., Charlotte, NC (US)

(72) Inventors: Chuanqing Zeng, Charlotte, NC (US); Jian Zeng, Charlotte, NC (US); Longchao Zhao, Charlotte, NC (US); Quanjin Shi, Charlotte, NC (US)

(73) Assignee: Hand Held Products, Inc., Charlotte, NC (US)

( * ) Notice: Subject to any disclaimer, the term of this patent is extended or adjusted under 35 U.S.C. 154(b) by 121 days.

(21) Appl. No.: 18/053,616

(22) Filed: Nov. 8, 2022

(65) Prior Publication Data
US 2023/0161979 A1 May 25, 2023

(30) Foreign Application Priority Data
Nov. 22, 2021 (CN) .......................... 202122864614.2

(51) Int. Cl.
*G06K 7/00* (2006.01)
*G06K 7/10* (2006.01)
*G06K 17/00* (2006.01)

(52) U.S. Cl.
CPC ..... *G06K 7/10227* (2013.01); *G06K 7/10316* (2013.01); *G06K 7/10445* (2013.01); *G06K 17/0025* (2013.01)

(58) Field of Classification Search
CPC ........... G06K 17/0025; G06K 19/0723; G06K 7/10316; G06K 7/10346; G06K 7/10089; G06K 7/10326; G06K 7/10623

USPC .................................................. 235/439, 492
See application file for complete search history.

(56) References Cited

U.S. PATENT DOCUMENTS

| | | | | |
|---|---|---|---|---|
| 7,832,952 B2* | 11/2010 | Klein | ..................... | G06K 17/00 400/719 |
| 7,843,344 B2* | 11/2010 | Feltz | ..................... | G06K 1/121 235/432 |
| 7,926,722 B2* | 4/2011 | Tsuchiya | ................ | H01Q 1/125 235/475 |
| 7,931,205 B2* | 4/2011 | Blanchard, Jr. | ....... | G06K 7/0008 235/441 |
| 8,154,574 B2* | 4/2012 | Neuhard | ............... | B65C 11/021 347/222 |
| 8,432,567 B2 | 4/2013 | Eberhardt, Jr. et al. | | |
| 8,790,027 B2* | 7/2014 | Neuhard | .................... | B41J 3/50 400/611 |
| 10,399,361 B2 | 9/2019 | Wong et al. | | |
| 2005/0280537 A1* | 12/2005 | Feltz | ...................... | G06K 1/121 340/572.1 |

(Continued)

FOREIGN PATENT DOCUMENTS

JP 4745987 B2 8/2011

*Primary Examiner* — Daniel St Cyr
(74) *Attorney, Agent, or Firm* — Alston & Bird LLP

(57) ABSTRACT

A radio-frequency identification (RFID) printer is provided. The RFID printer may include an RFID antenna component and a rotatable antenna bracket component. The rotatable antenna bracket component may include a first knob portion, a first elongated portion and a first side portion projecting from a first end of the first elongated portion and connecting the first elongated portion to the first knob portion. The RFID antenna component may be secured in the first elongated portion.

19 Claims, 12 Drawing Sheets

(56) References Cited

U.S. PATENT DOCUMENTS

| | | |
|---|---|---|
| 2022/0277184 A1 | 9/2022 | Hao et al. |
| 2023/0161979 A1* | 5/2023 | Zeng .................. G06K 7/10227 340/10.51 |

* cited by examiner

RADIO-FREQUENCY IDENTIFICATION (RFID) PRINTER WITH A ROTATABLE ANTENNA BRACKET COMPONENT

CROSS-REFERENCE TO RELATED APPLICATIONS

This application claims priority pursuant to 35 U.S.C. 119(a) to Chinese Application No. 202122864614.2, filed Nov. 22, 2021, which application is incorporated herein by reference in its entirety.

FIELD OF THE INVENTION

The present disclosure relates generally to apparatuses, systems, and methods for manufacturing radio-frequency identification (RFID) tags, labels, media, and/or the like. More particularly, various embodiments of the present disclosure provide example RFID printers with rotatable antenna bracket components, as well as example methods for operating such example RFID printers to encode RFID tags, RFID labels, RFID media, and/or the like.

BACKGROUND

RFID tags (also referred to as RFID labels) are parts of a tracking system that utilizes radio frequency and electromagnetic fields to search, identify, and/or track objects, items, and people. For example, digital data may be encoded in RFID tags that are attached to objects, items, and people. As these objects, items, and people move, an RFID reader may capture digital data from these RFID tags via radio waves.

Applicant has identified many deficiencies and problems associated with existing methods, apparatus, and systems related to manufacturing RFID tags.

BRIEF SUMMARY

Various embodiments described herein relate to methods, apparatuses, and systems for improving the performance of radio-frequency identification (RFID) printers. In particular, various embodiments are related to an RFID printer with a rotatable antenna bracket component.

In accordance with various embodiments of the present disclosure, an example RFID printer may be provided. In some embodiments, the example RFID printer may comprise an example RFID antenna component and an example rotatable antenna bracket component.

In some embodiments, the example rotatable antenna bracket component may comprise a first knob portion, a first elongated portion, and a first side portion. In some embodiments, the first side portion may project from a first end of the first elongated portion. In some embodiments, the first side portion may connect the first elongated portion of the example rotatable antenna bracket component to the first knob portion of the example rotatable antenna bracket component.

In some embodiments, the example RFID antenna component may be secured in the first elongated portion of the example rotatable antenna bracket component.

In some embodiments, the first side portion of the example rotatable antenna bracket component may be in a first perpendicular arrangement with the first elongated portion of the example rotatable antenna bracket component.

In some embodiments, the example RFID printer may further comprise a printer housing. In some embodiments, the printer housing may comprise a first wall defining a first knob aperture. In some embodiments, the first knob portion of the example rotatable antenna bracket component may be positioned within the first knob aperture of the printer housing. In some embodiments, the first knob portion of the example rotatable antenna bracket component may be rotatable within the first knob aperture of the printer housing.

In some embodiments, the example rotatable antenna bracket component may further comprise a second knob portion and a second side portion. In some embodiments, the second side portion of the example rotatable antenna bracket component may project from a second end of the first elongated portion of the example rotatable antenna bracket component.

In some embodiments, the second end of the first elongated portion may be opposite to the first end of the first elongated portion. In some embodiments, the second side portion of the example rotatable antenna bracket component may connect the first elongated portion of the example rotatable antenna bracket component to the second knob portion of the example rotatable antenna bracket component.

In some embodiments, the example RFID printer further may comprise a first media support component. In some embodiments, the first media support component may comprise a first media support surface. In some embodiments, the first media support component may be positioned adjacent to the example rotatable antenna bracket component. In some embodiments, an example RFID media may travel on the first media support surface in a printing direction.

In some embodiments, the example RFID printer further may comprise a second media support component. In some embodiments, the second media support component may comprise a second media support surface. In some embodiments, the second media support component may be connected to the first media support component via a connection bridge component. In some embodiments, the example rotatable antenna bracket component may be positioned between the first media support component and the second media support component.

In some embodiments, the connection bridge component may define a second knob aperture. In some embodiments, the second knob portion of the example rotatable antenna bracket component may be positioned within the second knob aperture of the connection bridge component. In some embodiments, the second knob portion of the example rotatable antenna bracket component may be rotatable within the second knob aperture of the connection bridge component.

In some embodiments, the first knob portion and/or the second knob portion may be configured to provide a plurality of rotary positions. In some embodiments, the example rotatable antenna bracket component may be configured to provide a plurality of example RFID encoding configurations based on the plurality of rotary positions of the first knob portion and/or the second knob portion.

In some embodiments, the plurality of example RFID encoding configurations may comprise a first example RFID encoding configuration and a second example RFID encoding configuration.

In some embodiments, when the example rotatable antenna bracket component is in the first example RFID encoding configuration, an example RFID media may travel above the example RFID antenna component.

In some embodiments, when the example rotatable antenna bracket component is in the second example RFID encoding configuration, the example RFID media may travel below the example RFID antenna component.

In some embodiments, the first elongated portion of the example rotatable antenna bracket component may comprise a first elongated surface and a second elongated surface. In some embodiments, the second elongated surface of the first elongated portion may be opposite to the first elongated surface of the first elongated portion. In some embodiments, the example RFID antenna component may be secured on the first elongated surface of the first elongated portion.

In some embodiments, when the example rotatable antenna bracket component is in the first example RFID encoding configuration, the example RFID media may travel above the second elongated surface of the first elongated portion.

In some embodiments, when the example rotatable antenna bracket component is in the second example RFID encoding configuration, the example RFID media may travel below the second elongated surface of the first elongated portion.

In some embodiments, the first knob portion of the example rotatable antenna bracket component may define a knob portion axis. In some embodiments, the example RFID antenna component may define an RFID antenna axis. In some embodiments, the RFID antenna axis and the knob portion axis may define an encoding direction for the example RFID antenna component to encode the example RFID media.

In some embodiments, each of the plurality of example RFID encoding configurations may be associated with a corresponding antenna angle that is between a printing direction of the example RFID media and the encoding direction.

In some embodiments, a first antenna angle associated with the first example RFID encoding configuration may be within a first open interval between 0° to 180°. In some embodiments, a second antenna angle associated with the second example RFID encoding configuration may be within a second open interval between 0° to −180°.

In some embodiments, the example rotatable antenna bracket component may further comprise a second elongated portion. In some embodiments, the first side portion of the example rotatable antenna bracket component may connect a first end of the second elongated portion to the first knob portion of the example rotatable antenna bracket component.

In some embodiments, the second elongated portion of the example rotatable antenna bracket component may be devoid of any example RFID antenna component.

In some embodiments, the first side portion of the example rotatable antenna bracket component may be in a second perpendicular arrangement with the second elongated portion of the example rotatable antenna bracket component.

In some embodiments, the example rotatable antenna bracket component may comprise a second knob portion and a second side portion. In some embodiments, the second side portion of the example rotatable antenna bracket component may connect a second end of the second elongated portion to the second knob portion of the example rotatable antenna bracket component. In some embodiments, the second end of the second elongated portion of the example rotatable antenna bracket component may be opposite to the first end of the second elongated portion of the example rotatable antenna bracket component.

In some embodiments, the example RFID printer may further comprise a first media support component. In some embodiments, the first media support component may be positioned adjacent to the example rotatable antenna bracket component. In some embodiments, the first media support component may comprise a first media support surface. In some embodiments, an example RFID media may travel on the first media support surface and between the first elongated portion of the example rotatable antenna bracket component and the second elongated portion of the example rotatable antenna bracket component in a printing direction.

In some embodiments, the example rotatable antenna bracket component may be configured to provide a plurality of example RFID encoding configurations based on a plurality of rotary positions of the first knob portion. In some embodiments, the plurality of example RFID encoding configurations may comprise a first example RFID encoding configuration and a second example RFID encoding configuration. In some embodiments, when the example rotatable antenna bracket component is in the first example RFID encoding configuration, the example RFID media may travel on top of the first elongated portion and under the second elongated portion. In some embodiments, when the example rotatable antenna bracket component is in the second example RFID encoding configuration, the example RFID media may travel under the first elongated portion and on top of the second elongated portion.

In accordance with various embodiments of the present disclosure, a method is provided. The method may include determining a type of the RFID media for calibration, causing an example rotatable antenna bracket component to rotate according to a plurality of example RFID encoding configurations, causing the example RFID printer to determine a signal strength for encoding the RFID media at each of the plurality of example RFID encoding configurations, and determining the best RFID encoding configuration for encoding the type of the RFID media based on the signal strength.

In accordance with various embodiments of the present disclosure, a method may be provided. The method may include determining a type of the RFID media for encoding, selecting an RFID encoding configuration from a plurality of example RFID encoding configurations based on the type of the RFID media, causing the example rotatable antenna bracket component to rotate according to the RFID encoding configuration, and causing the example RFID printer to encode the RFID media.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1A:
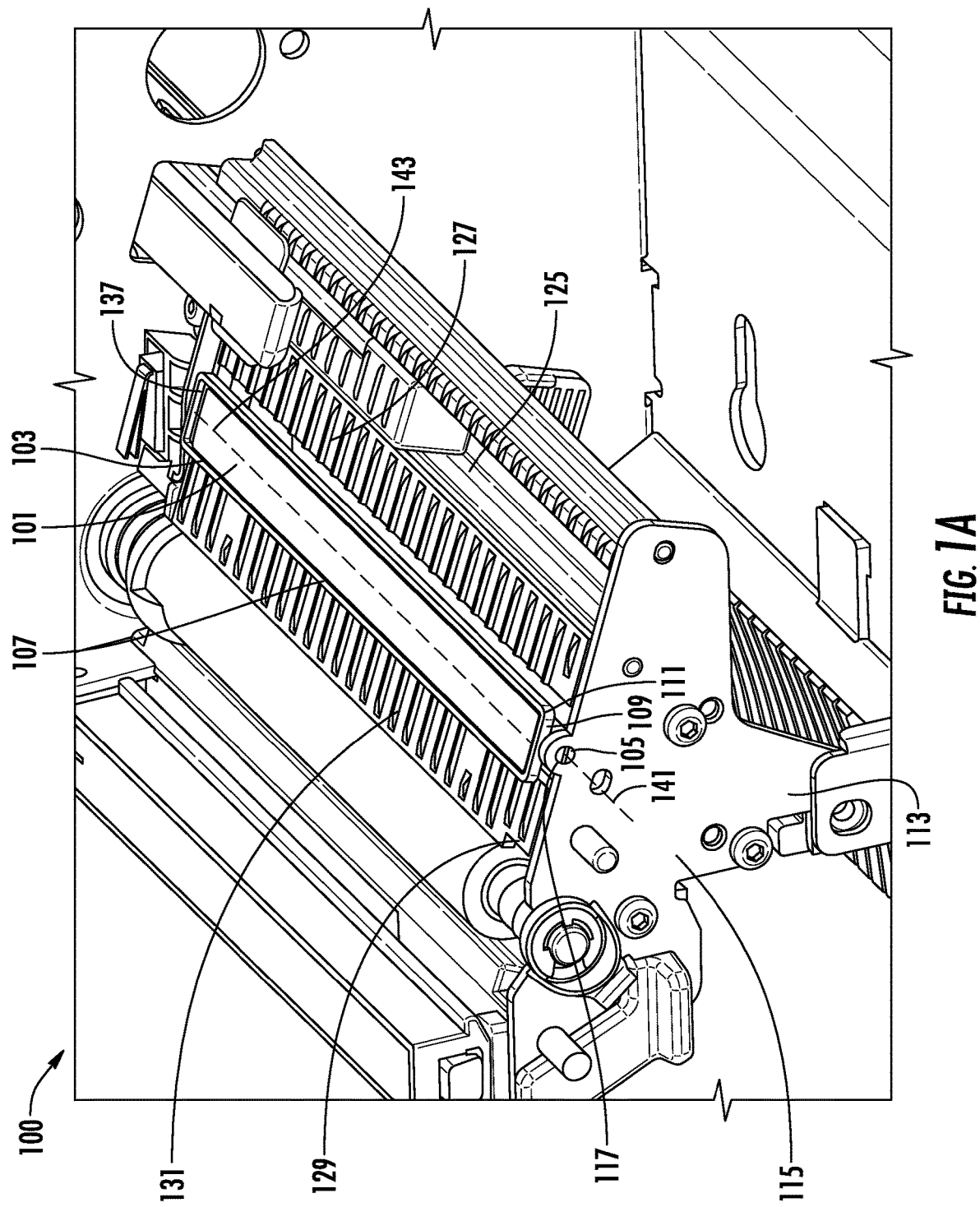
FIG. 1A illustrates an example perspective view of at least a portion of an example RFID printer in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

As described above, RFID tags may be utilized to search, identify, and/or track objects, items, and people. In some examples, RFID tags may comprise an RFID inlay that includes an integrated circuit (IC) and an antenna that are disposed on a substrate. In some examples, the IC may include a memory circuitry that stores digital data (such as, but not limited to, an electronic product code (EPC), a unique tag identification (ID) number). For example, when an RFID tag is manufactured, a unique tag ID number may be encoded to the IC. When the RFID tag is attached to an object, the unique tag ID number can be associated with the object for searching and tracking purposes.

In some embodiments, the IC is connected to the antenna and may utilize the antenna to transmit digital data to an RFID reader via radio waves. In some examples, the RFID reader may convert the radio waves received from the RFID tag to digital data. For example, the RFID reader may generate a high frequency electromagnetic wave (also referred to as a radio frequency (RF) interrogation signal), which may trigger the RFID tag to transmit an RF response signal (which may embed digital data) to an RFID reader. In some embodiments, examples of RFID tags may be in the form of passive tags that are powered by energy from the RF interrogation signal transmitted by the RFID reader. In some embodiments, examples of RFID tags may be in the form of active tags that are powered by a battery.

In some embodiments, an RFID printer refers to an apparatus that can encode digital data (such as, but not limited to, the unique tag ID number) into an RFID inlay of an RFID tag. For example, the RFID printer may comprise an antenna that can transmit RF signals to the RFID inlay of an RFID tag to establish a data link between the antenna of the RFID printer and the RFID inlay of the RFID tag. In some examples, an RF signal is an electromagnetic wave that can transport information through air from one point to another. In some examples, digital data to be written to the RFID inlay of the RFID tag (such as, but not limited to, the unique tag ID number) may be embedded in the RF signals by the RFID printer. In some embodiments, upon receiving the RF signals from the antenna of the RFID printer, the IC in the RFID inlay of the RFID tag may store the digital data (such as, but not limited to, the unique tag ID number) in the memory circuitry. In some embodiments, the IC in the RFID inlay of the RFID tag may transmit an RF signal back to the antenna of the RFID printer to acknowledge the receipt of digital information (such as, but not limited to, the unique tag ID number) and/or to confirm that the digital information (such as, but not limited to, the unique tag ID number) has been encoded in the IC of the RFID inlay.

In some embodiments, an RFID printer may print images (such as, but not limited to, barcodes) on the RFID tag in addition to encoding the RFID inlay of the RFID tag.

As described above, there are many technical challenges, difficulties, and limitations in manufacturing RFID tags and labels.

For example, in RFID printers (such as, but not limited to, industrial RFID printers), an RFID antenna is positioned under an RFID tag to encode digital data to the RFID tag. The RFID antenna needs to ensure that the RFID printer maintains lasting stability in the communications with the RFID tags while printing and encoding the RFID tags, regardless of the types/categories of the RFID tags. As a practical matter, there are many different types and categories of RFID tags.

As an example, RFID tags may include, but not limited to, normal RFID tags and anti-metal RFID tags (also referred to as on-metal RFID tags). In this example, an anti-metal RFID tag may include a shielding layer at the bottom of the anti-metal RFID tag that may shield or block RF signals. Because the RFID antenna of the RFID printer is positioned under the RFID tag, the RFID antenna may encounter difficulties in reading data from and/or writing data to the anti-metal RFID tag due to the shielding layer. In contrast, a normal RFID tag may not include the shielding layer, and the RFID antenna of the RFID printer may more easily read data from and/or write data to the normal RFID tag even if it is positioned under the RFID tag.

In some examples, in order to be compatible with different types of RFID tags (such as, but not limited to, both normal RFID tags and anti-metal RFID tags described above), an example RFID printer may use two antennas (for example, one antenna positioned above the RFID tag and one antenna below the RFID tag). When the RFID printer is calibrated, the two antennas can separately be switched on to perform read-write calibration operations on an RFID tag before selecting an appropriate antenna from the two antennas for encoding the RFID tag. For example, the antenna on top of the RFID tag can be turned on while encoding an anti-metal tag so as to avoid the shielding layer, while the antenna under the RFID tag can be turned on while encoding a normal RFID tag.

However, it may be not practical to implement two RFID antennas in every RFID printer. For example, many RFID printers may have certain requirements for space and/or cost, and implementing two antennas in such RFID printers may not satisfy the space and/or cost requirements. As an example, some RFID printers may require a compact housing (for example, due to the environment that the RFID printer is implemented in), and therefore does not provide sufficient space for including two antennas within the housing of the RFID printers. As another example, some RFID printers may require a low cost for manufacturing, and utilizing two antennas may increase the cost for manufacturing and therefore cannot be implemented in these RFID printers.

In contrast, various embodiments of the present disclosure overcome the above-referenced technical challenges and difficulties, and provide various technical improvements and benefits.

For example, an example RFID printer in accordance with embodiments of the present disclosure may provide an RFID antenna component that uses a rotating mechanism, such as via a rotatable antenna bracket component. The rotatable antenna bracket component (along with the RFID antenna component) can be rotated to different positions according to the type of RFID tag that the RFID printer is encoding. For example, the rotatable antenna bracket component (along with the RFID antenna component) can be rotated to be positioned above the RFID tag. As another example, the rotatable antenna bracket component (along with the RFID antenna component) can be rotated to be positioned below the RFID tag. As another example, the rotatable antenna bracket component (along with the RFID antenna component) can be rotated to be at an angle to the RFID tag.

For example, by default, the rotatable antenna bracket component (along with the RFID antenna component) is rotated to be positioned under the RFID tag to encode the RFID tag. When the RFID antenna component is encoding an RFID tag such as an anti-metal tag, the rotatable antenna bracket component (along with the RFID antenna component) is rotated to be positioned above the RFID tag.

For example, various embodiments of the present disclosure may rotate the RFID antenna component to different positions through RFID printer calibration. In some embodiments, the RFID antenna component is fixed on the rotatable antenna bracket component. In some embodiments, the rotatable antenna bracket component and other components (such as a media support component or a media guide) are fixed by a damping structure, and the RFID antenna component can hover in two positions that include one position being above the RFID tag and another position being below the RFID tag. If one of the positions fails during the RFID tag printing and calibration, the rotatable antenna bracket component can be rotated to another position (for example, by using a screwdriver to rotate a slot on the rotatable antenna bracket component). In some embodiments, examples of the present disclosure may determine the best position of the rotatable antenna bracket component (along with the RFID antenna component) for encoding each type and/or category of RFID tags.

As such, various example embodiments of the present disclosure may overcome various technical challenges and difficulties, and may be compatible to encode different types of RFID tags (such as, but not limited to, normal RFID tags and anti-metal RFID tags described above) while satisfying the space and cost requirements of many RFID printers. For example, various embodiments of the present disclosure use only one antenna to encode two or more types of RFID tags to meet space requirements and save costs. An example RFID antenna component in accordance with various embodiments of the present disclosure may use a rotating mechanism. The example RFID antenna component can be rotated to different positions (from a 0-degree position to ±180-degree positions) according to the types of RFID tags.

Figure 1B:
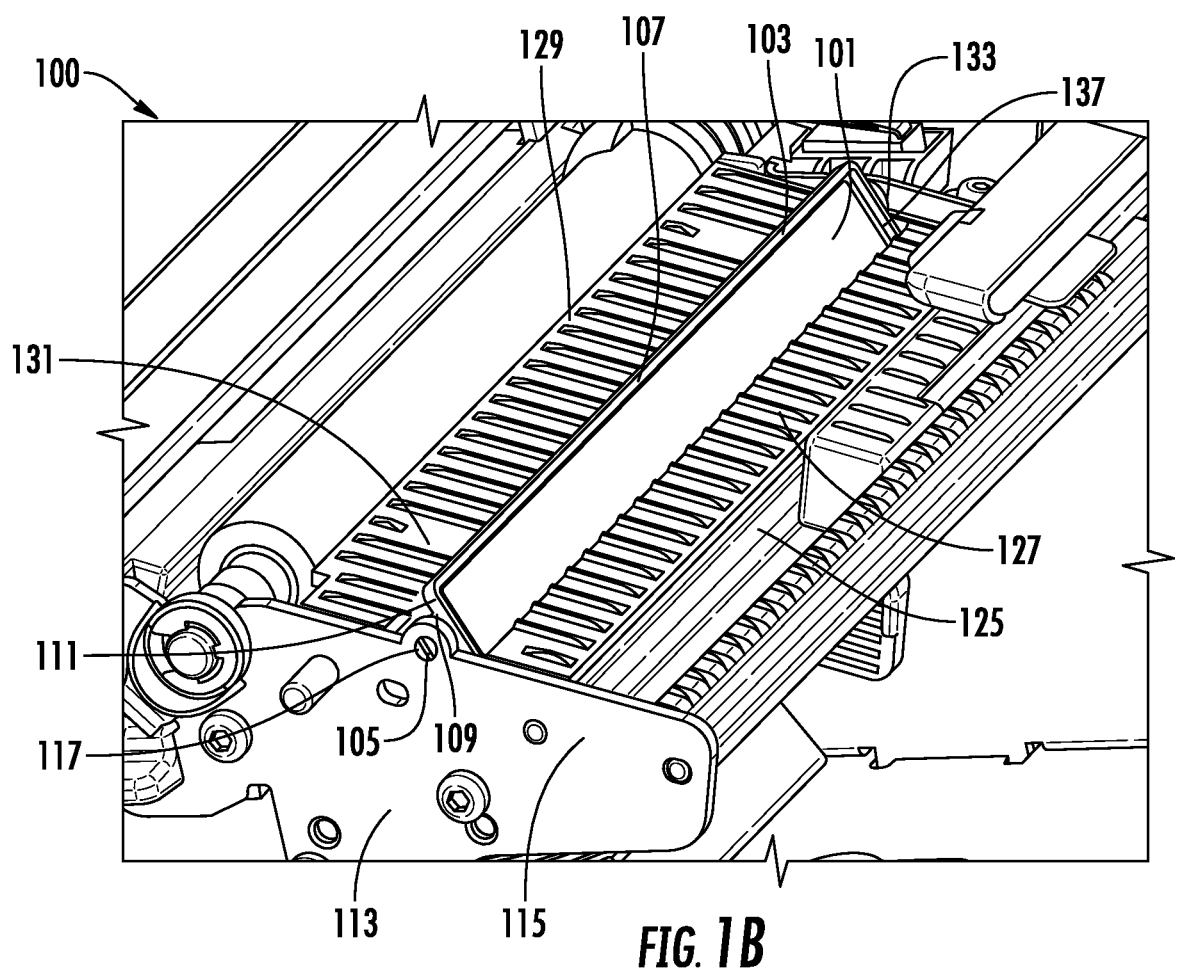
FIG. 1B illustrates another example perspective view of at least a portion of the example RFID printer shown in FIG. 1A in accordance with various embodiments of the present disclosure.
Figure 1C:
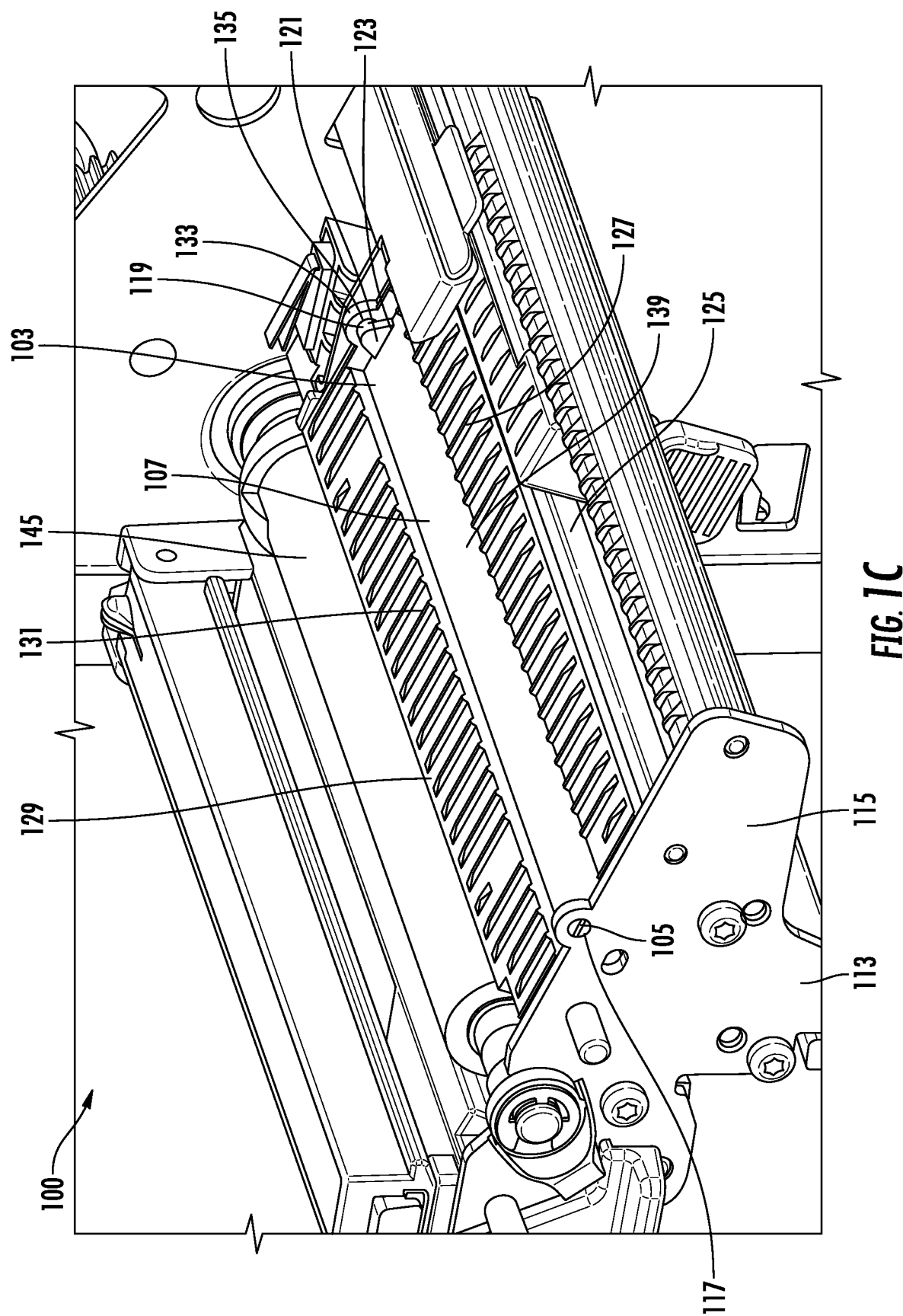
FIG. 1C illustrates another example perspective view of at least a portion of the example RFID printer shown in FIG. 1A in accordance with various embodiments of the present disclosure.

Referring now to FIG. 1A to FIG. 1C, an example RFID printer 100 in accordance with various embodiments of the present disclosure is illustrated.

In particular, FIG. 1A illustrates an example perspective view of at least a portion of an example RFID printer 100 that includes a rotatable antenna bracket component 103 in accordance with various embodiments of the present disclosure. In the example shown in FIG. 1A, the rotatable antenna bracket component 103 is positioned above an RFID media. FIG. 1B illustrates another example perspective view of at least a portion of the example RFID printer 100 as the rotatable antenna bracket component 103 rotates in accordance with various embodiments of the present disclosure. FIG. 1C illustrates another example perspective view of at least a portion of the example RFID printer 100 as the rotatable antenna bracket component 103 completes the rotation shown in FIG. 1B in accordance with various embodiments of the present disclosure. In the example shown in FIG. 1C, the rotatable antenna bracket component 103 is positioned under the RFID media.

Referring now to FIG. 1A, in accordance with various embodiments of the present disclosure, an example RFID printer 100 is provided. In the example shown in FIG. 1A, the example RFID printer 100 comprises an example RFID antenna component 101 and an example rotatable antenna bracket component 103.

In some embodiments, the example RFID antenna component 101 may comprise materials that can transmit RF signals, such as, but not limited to, metal (such as, but not limited to, etched copper, aluminum), conductive ink, and/or the like. Additionally, or alternatively, in some embodiments, the example RFID antenna component 101 may comprise one or more additional and/or alternative materials.

In some embodiments, the example RFID antenna component 101 may comprise a suitable antenna structure for transmitting RF signals. For example, the example RFID antenna component 101 may be a one-turn antenna that may be in the shape of a single loop. As another example, the example RFID antenna component 101 may be a multi-turn antenna that may be in the shape of a multi-turn loop.

While the description above describes some example structures of the RFID antenna component, it is noted that the scope of the present disclosure is not limited to the description and examples above. In some examples, an example RFID antenna component may include one or more additional and/or alternative structures.

In some embodiments, the example RFID antenna component 101 may convert electrical current into electromagnetic waves that are then radiated into space as RF signals. In some embodiments, the example RFID antenna component 101 may embed digital information in the RF signals (such as, but not limited to, the unique tag ID number). In some embodiments, the example RFID antenna component 101 may transmit the RF signals at one or more particular frequency bands and/or ranges. In some embodiments, the frequency bands and/or ranges of the RF signals may be determined based on the frequency bands and/or ranges of the RFID tag to be encoded by the example RFID printer 100.

For example, the RFID tag to be encoded by the example RFID printer 100 may be an example ultra-high frequency (UHF) tag. The example UHF tag may operate at a 860 MHz to 960 MHz range if it is a passive tag, and may operate at 433 MHz if it is an active tag. In such an example, the example RFID antenna component 101 may emit RF signals at the 860 MHz to 960 MHz range for encoding a passive UHF tag, and may emit RF signals at 433 MHz for encoding an active tag.

As another example, the RFID tag to be encoded by the example RFID printer 100 may be an example high frequency (HF) tag, which may operate at 13.56 MHz. In such an example, the example RFID antenna component 101 may emit RF signals at 13.56 MHz for encoding an example HF tag.

As another example, the RFID tag to be encoded by the example RFID printer 100 may be an example low frequency (LF) tag, which may operate at a 125 KHz to 134.2 KHz range. In such an example, the example RFID antenna component 101 may emit RF signals at the 125 KHz to 134.2 KHz range for encoding an example LF tag.

While the description above describes some example frequencies and example frequency ranges for the example RFID antenna component to transmit RF signals, it is noted that the scope of the present disclosure is not limited to the description and examples above. In some examples, examples of RF signals generated and/or transmitted by the example RFID antenna component may be at or within one or more additional and/or alternative frequencies and/or frequency ranges.

Referring back to FIG. 1A, in some embodiments, the example rotatable antenna bracket component 103 comprises a first knob portion 105, a first elongated portion 107, and a first side portion 109.

In some embodiments, the example rotatable antenna bracket component 103 may comprise materials such as, but not limited to, plastic. In some embodiments, the example rotatable antenna bracket component 103 may comprise one or more additional and/or alternative materials.

In some embodiments, the first elongated portion 107 may be in a shape similar to a cuboid shape. For example, the first elongated portion 107 may have a length that is elongated compared to its width and/or its height. In some embodiments, the print direction of the RFID media is in a parallel arrangement with a direction of the width of the first elongated portion 107, details of which are described herein.

In some embodiments, the example RFID antenna component 101 is secured in the first elongated portion 107 of the example rotatable antenna bracket component 103. For example, the first elongated portion 107 of the example rotatable antenna bracket component 103 comprises a first elongated surface 137 (as shown in FIG. 1A and FIG. 1B) and a second elongated surface 139 (as shown in FIG. 1C). In some embodiments, the second elongated surface 139 of the first elongated portion 107 is opposite to the first elongated surface 137 of the first elongated portion 107. In some embodiments, the example RFID antenna component 101 is secured on the first elongated surface 137 of the first elongated portion 107 (as shown in FIG. 1A and FIG. 1B).

In some embodiments, the example RFID antenna component 101 is attached to the first elongated surface 137 of the first elongated portion 107. Additionally, or alternatively, the example RFID antenna component 101 is embedded in or on the first elongated surface 137 of the first elongated portion 107. Additionally, or alternatively, the example RFID antenna component 101 is secured in the first elongated portion 107 of the example rotatable antenna bracket component 103 through one or more additional or alternative ways.

Referring back to FIG. 1A, in some embodiments, the first side portion 109 of the example rotatable antenna bracket component 103 projects from a first end 111 of the first elongated portion 107. For example, the first side portion 109 may extend outwards from a surface of the first elongated portion 107 at the first end 111.

In some embodiments, the first side portion 109 of the example rotatable antenna bracket component 103 is in a first perpendicular arrangement with the first elongated portion 107 of the example rotatable antenna bracket component 103. For example, an outer surface of the first side portion 109 may be perpendicular to an outer surface of the first elongated portion 107.

While the description above provides an example arrangement between the first side portion 109 and the first elongated portion 107, it is noted that the scope of the present disclosure is not limited to the description above.

In some embodiments, the first side portion 109 of the example rotatable antenna bracket component 103 connects the first elongated portion 107 to the first knob portion 105. As described above, the first side portion 109 may extend from an outer surface of the first elongated portion 107. For example, the first side portion 109 may comprise a first surface and a second surface opposite to the first surface. The first surface of the first side portion 109 may have a first end, and the second surface of the first side portion 109 may have a second end that is opposite to the first end of the first surface of the first side portion 109. In some embodiments, the first end 111 of the first elongated portion 107 is connected to the first end of the first surface of the first side portion 109, and the first knob portion 105 is connected to the second end of the second surface of the first side portion 109.

In some embodiments, the first knob portion 105 may be in a shape similar to a cylinder shape. For example, the first knob portion 105 may comprise two parallel circular base surfaces that are joined by a curved side surface. In some embodiments, the curved side surface of the first knob portion 105 enables the first knob portion 105 (along with other portions of the example rotatable antenna bracket component 103) to be rotated. In some embodiments, a slot may be formed on one of the two parallel circular base surfaces, and the slot may be used to control the rotary position of the first knob portion 105 (along with other portions of the example rotatable antenna bracket component 103).

For example, the head of a flathead screwdriver may be inserted into the slot of the first knob portion 105. As the flathead screwdriver rotates, the first knob portion 105 may rotate, causing the other portions of the example rotatable antenna bracket component 103 (including the first elongated portion 107 and the first side portion 109) to rotate. Additionally, or alternatively, the first knob portion 105 may be connected to one or more actuators or motors via one or more belts, and the one or more actuators or motors may control the rotary position of the first knob portion 105. Additionally, or alternatively, the rotary position of the first knob portion 105 may be controlled through other mechanisms.

While the description above provides an example shape of the first knob portion 105, it is noted that the scope of the present disclosure is not limited to the description above. In some examples, an example first knob portion 105 may be in one or more additional and/or alternative shapes.

In some embodiments, the example RFID printer 100 further comprises a printer housing 113. In some embodiments, the printer housing 113 may provide an enclosure or case for some or all components within the printer housing 113. In FIG. 1A, only a portion of the printer housing 113 is shown.

In some embodiments, the printer housing 113 comprises a first wall 115. In some embodiments, the first wall 115 defines (e.g. includes) a first knob aperture 117. In some embodiments, the first knob portion 105 of the example rotatable antenna bracket component 103 is positioned within the first knob aperture 117 of the printer housing 113. For example, a diameter of the first knob aperture 117 may equal or be larger than a diameter of the circular base surface of the first knob portion 105 so that the first knob portion 105 is disposed within the first knob aperture 117 (e.g. the side surface of the first knob portion 105 being in contact with the first knob aperture 117).

In some embodiments, the first knob portion 105 of the example rotatable antenna bracket component 103 is rotatable within the first knob aperture 117 of the printer housing 113. In some embodiments, the first knob portion 105 (and first side portion 109) of the example rotatable antenna bracket component 103 may provide a damping structure that connects the example rotatable antenna bracket component 103 to the printer housing 113, while allowing the example rotatable antenna bracket component 103 to rotate. Because the example RFID antenna component 101 is secured in the first elongated portion 107 of the example rotatable antenna bracket component 103, the example RFID antenna component 101 is rotated when the first knob portion 105 rotates within the first knob aperture 117 of the printer housing 113.

In the example shown in FIG. 1A, the first knob portion 105 may define a knob portion axis 141. For example, the first knob portion 105 may rotate along the knob portion axis 141, which may be a central axis of the first knob portion 105. In some embodiments, the example RFID antenna component 101 may define an RFID antenna axis 143, which may be a central axis of the example RFID antenna component 101. In some embodiments, at least because of the first side portion 109, the knob portion axis 141 is parallel to the RFID antenna axis 143 and does not overlap with the RFID antenna axis 143. In some embodiments, at least because of the first side portion 109, the knob portion axis 141 may intersect the RFID antenna axis 143 but does not overlap with the RFID antenna axis 143. As such, as the first knob portion 105 rotates along the knob portion axis 141, the RFID antenna axis 143 of the example RFID antenna component 101 rotates around the knob portion axis 141 but does not overlap with the knob portion axis 141.

Referring now to FIG. 1C, in some embodiments, the example rotatable antenna bracket component 103 further comprises a second knob portion 119 and a second side portion 121.

In some embodiments, the second side portion 121 of the example rotatable antenna bracket component 103 projects from a second end 123 of the first elongated portion 107 of the example rotatable antenna bracket component 103. For example, the second side portion 121 may extend outwards from a surface of the first elongated portion 107 at the second end 123. In some embodiments, the second end 123 of the first elongated portion 107 is opposite to the first end 111 of the first elongated portion 107. In some embodiments, the second side portion 121 of the example rotatable antenna bracket component 103 is in a second perpendicular arrangement with the first elongated portion 107 of the example rotatable antenna bracket component 103, similar to those described above in connection with the first side portion 109.

In some embodiments, the second side portion 121 of the example rotatable antenna bracket component 103 connects the first elongated portion 107 of the example rotatable antenna bracket component 103 to the second knob portion 119 of the example rotatable antenna bracket component 103. For example, as described above, the second side portion 121 may extend from an outer surface of the first elongated portion 107.

In some embodiments, the second side portion 121 may comprise a first surface and a second surface opposite to the first surface. The first surface of the second side portion 121 may have a first end, and the second surface of the second side portion 121 may have a second end that is opposite to the first end of the first surface of the second side portion 121. In some embodiments, the second end 123 of the first elongated portion 107 is connected to the first end of the first surface of the second side portion 121, and the second knob portion 119 is connected to the second end of the second surface of the second side portion 121.

As shown in FIG. 1C, the second knob portion 119 may be in a cylinder shape, similar to the first knob portion 105 described above. In some embodiments, the second knob portion 119 is rotatable, similar to the first knob portion 105 described above.

In some embodiments, the example RFID printer 100 further comprises a first media support component 125. In some embodiments, the first media support component 125 comprises a first media support surface 127. In some embodiments, an RFID media may travel on the first media support surface 127. In the example shown in FIG. 1C, the first media support component 125 may comprise a plurality of grooves for guiding the travel of the RFID media.

In the present disclosure, the term "RFID media" refers to a media that includes an RFID inlay. As described, the RFID inlay may include an IC and an antenna that are connected to one another and may be disposed on a substrate. In some embodiments, the example RFID printer may encode digital data to the IC of the RFID media through the example RFID antenna component. For example, an example RFID media may be in the form of an example RFID tag, an example RFID label, and/or the like.

In some embodiments, the first media support component 125 is positioned adjacent to the example rotatable antenna bracket component 103. In some embodiments, an example RFID media travels on the first media support surface 127 in a printing direction. For example, the printing direction may be from the first media support component 125 to the example rotatable antenna bracket component 103.

In some embodiments, the example RFID printer 100 further comprises a second media support component 129. In some embodiments, the second media support component 129 comprises a second media support surface 131. In some embodiments, an RFID media may travel on the second media support surface 131 in a printing direction. For example, the printing direction may be from the example rotatable antenna bracket component 103 to the second media support surface 131. In the example shown in FIG. 1C, the second media support component 129 may comprise a plurality of grooves for guiding the travel of the RFID media, similar to those of the first media support component 125.

In some embodiments, the second media support component 129 is connected to the first media support component 125 via a connection bridge component 133. For example, the connection bridge component 133 may connect one end of the first media support component 125 to one end of the second media support component 129. In some embodiments, the plurality of grooves on the first media support surface 127 are parallel to the plurality of grooves on the second media support surface 131 so as to continuously guide the travel of the RFID media.

In the example shown in FIG. 1C, the connection bridge component 133 creates a gap between the first media support component 125 and the second media support component 129, and the example rotatable antenna bracket component 103 is positioned between the first media support component 125 and the second media support component 129.

In some embodiments, the connection bridge component 133 defines (e.g. includes) a second knob aperture 135. In some embodiments, the second knob portion 119 of the example rotatable antenna bracket component 103 is positioned within the second knob aperture 135 of the connection bridge component 133.

For example, a diameter of the second knob aperture 135 may equal or be larger than a diameter of the circular base surface of the second knob portion 119 so that the second knob portion 119 is disposed within the second knob aperture 135 (e.g. the side surface of the second knob portion 119 being in contact with the second knob aperture 135). In some embodiments, the second knob portion 119 of the example rotatable antenna bracket component 103 is rotatable within the second knob aperture 135 of the connection bridge component 133, similar to those described above in connection with the first knob portion 105 and the first knob aperture 117.

In some embodiments, the travel of the RFID media may be driven at least in part by the roller 145. For example, the RFID media may be a part of an RFID media roll that is placed on a media supply spindle within the example RFID printer 100. In some embodiments, the RFID media is unwound from the RFID media roll and travels in a printing direction that includes to the first media support component 125, then to the example rotatable antenna bracket component 103, then to the second media support component 129, and then to the roller 145. In some embodiments, the roller 145 (and another roller that is placed on top of the roller 145) may rotate, which causes the RFID media to be unwound from the RFID media roll and travel in the printing direction as described above.

While the description above provides an example of printing direction, it is noted that the scope of the present disclosure is not limited to the description above. In some examples, an example printing direction may be different than those described above. For example, the roller 145 may be placed prior to the first media support component 125 in the printing direction.

In some embodiments, the first knob portion 105 and/or the second knob portion 119 are configured to provide a plurality of rotary positions. For example, the first knob portion 105 and/or the second knob portion 119 may be rotated manually and/or through one or more actuators/motors as described above.

In some embodiments, as the first knob portion 105 and/or the second knob portion 119 of the example rotatable antenna bracket component 103 rotate, the first elongated portion 107 (along with the example RFID antenna component 101) rotates as well. As such, the example rotatable antenna bracket component 103 is configured to provide a plurality of example RFID encoding configurations for the example RFID antenna component 101 based on the plurality of rotary positions of the first knob portion 105 and/or the second knob portion 119.

For example, the plurality of example RFID encoding configurations comprises a first example RFID encoding configuration and a second example RFID encoding configuration.

In some embodiments, when the example rotatable antenna bracket component 103 is in the first example RFID encoding configuration, an example RFID media is above the example RFID antenna component 101.

Referring now to FIG. 1C, an example of the first example RFID encoding configuration is illustrated. In this example, when the example rotatable antenna bracket component 103 is in the first example RFID encoding configuration, the example RFID media is above the second elongated surface 139 of the first elongated portion 107. For example, the RFID media travels on the first media support surface 127 of the first media support component 125, then on the second elongated surface 139 of the first elongated portion 107, and then on the second media support surface 131 of the second media support component 129. As shown, when the example rotatable antenna bracket component 103 is in the first example RFID encoding configuration, the example RFID antenna component 101 may encode the RFID media from the bottom of the RFID media. In some embodiments, the first example RFID encoding configuration may be implemented to encode digital data to an RFID media that does not include a shielding layer at the bottom of the RFID media (e.g. not an anti-metal RFID tag).

In some embodiments, when the example rotatable antenna bracket component 103 is in the second example RFID encoding configuration, the example RFID media is below the example RFID antenna component 101.

Referring now to FIG. 1A, an example of the second example RFID encoding configuration is illustrated. In this example, when the example rotatable antenna bracket component 103 is in the second example RFID encoding configuration, the example RFID media is below the second elongated surface 139 of the first elongated portion 107.

For example, the RFID media travels on the first media support surface 127 of the first media support component 125, then under the second elongated surface 139 of the first elongated portion 107 (for example, above the gap between the first media support component 125 and the second media support component 129), and then on the second media support surface 131 of the second media support component 129. As shown, when the example rotatable antenna bracket component 103 is in the second example RFID encoding configuration, the example RFID antenna component 101 may encode the RFID media from the top of the RFID media. In some embodiments, the second example RFID encoding configuration may be implemented to encode digital data to an RFID media that includes a shielding layer at the bottom of the RFID media (e.g. an anti-metal RFID tag).

As described above, in some embodiments, the first knob portion of the example rotatable antenna bracket component defines a knob portion axis, and the example RFID antenna component defines an RFID antenna axis. In some embodiments, the RFID antenna axis and the knob portion axis define an encoding direction for the example RFID antenna component to encode the example RFID media. In some embodiments, each of the plurality of example RFID encoding configurations is associated with a corresponding antenna angle that is between a printing direction of the example RFID media and the encoding direction.

Referring now to FIG. 2A to FIG. 2D, example diagrams illustrating example antenna angles associated with example RFID encoding configurations in accordance with various embodiments of the present disclosure are illustrated. FIG. 2A to FIG. 2D illustrate example side views of an example rotatable antenna bracket component as the RFID media is positioned either above the example rotatable antenna bracket component or below the example rotatable antenna bracket component for encoding.

Figure 2A:
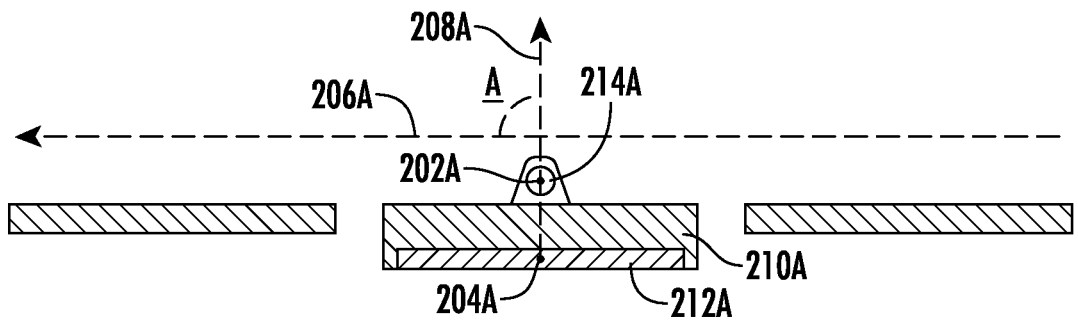
FIG. 2A is an example diagram illustrating an antenna angle associated with an example RFID encoding configuration in accordance with various embodiments of the present disclosure.
Figure 2B:
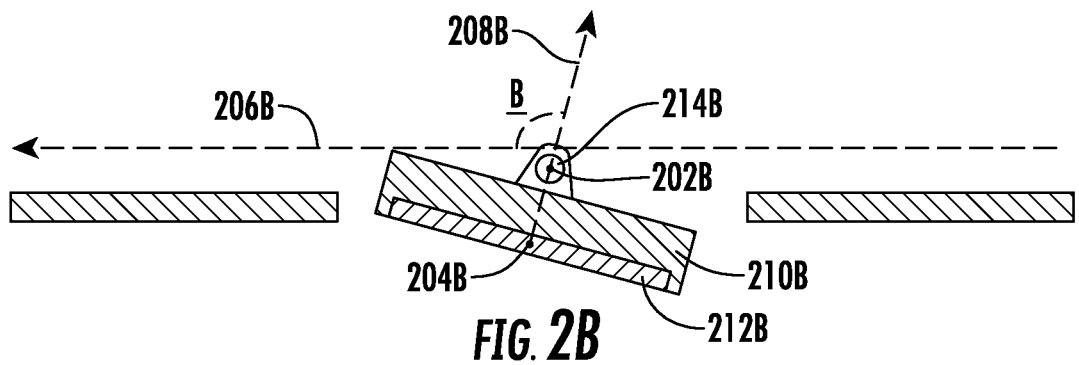
FIG. 2B is an example diagram illustrating an antenna angle associated with an example RFID encoding configuration in accordance with various embodiments of the present disclosure.

FIG. 2A and FIG. 2B illustrate example antenna angles associated with the first example RFID encoding configuration. As described above, when the example rotatable antenna bracket component is in the first example RFID encoding configuration, an example RFID media is above the example RFID antenna component.

In some embodiments, when the example rotatable antenna bracket component is in the first example RFID encoding configuration, a first antenna angle associated with the first example RFID encoding configuration is within a first open interval between 0° to 180°.

For example, in the example shown in FIG. 2A, the RFID media may travel in a travel direction 206A, and the example rotatable antenna bracket component 210A is in the first example RFID encoding configuration so that the RFID media travels above the example RFID antenna component 212A. When the RFID media is above the example RFID antenna component 212A, the example RFID antenna component 212A may transmit RF signals to encode the RFID media. In particular, the encoding direction 208A may be defined by connecting the RFID antenna axis 204A of the example RFID antenna component 212A to the knob portion axis 202A of the first knob portion 214A of the example rotatable antenna bracket component 210A. In the example shown in FIG. 2A, the antenna angle A may be 90°. In some embodiments, the example RFID antenna component 212A may be in a parallel arrangement with the RFID media.

As another example, in the example shown in FIG. 2B, the RFID media may travel in a travel direction 206B, and the example rotatable antenna bracket component 210B is in the first example RFID encoding configuration so that the RFID media travels above the example RFID antenna component 212B. When the RFID media is above the example RFID antenna component 212B, the example RFID antenna component 212B may transmit RF signals to encode the RFID media. In particular, the encoding direction 208B may be defined by connecting the RFID antenna axis 204B of the example RFID antenna component 212B to the knob portion axis 202B of the first knob portion 214B of the example rotatable antenna bracket component 210B. In the example shown in FIG. 2B, the antenna angle B may be a positive obtuse angle.

While the description above provides examples of antenna angles when the example rotatable antenna bracket component is in the first example RFID encoding configuration, it is noted that the scope of the present disclosure is not limited to the description above. In some examples, an example antenna angle when the example rotatable antenna bracket component is in the first example RFID encoding configuration may be of other values. For example, the example antenna angle when the example rotatable antenna bracket component is in the first example RFID encoding configuration may be a positive acute angle.

Figure 2C:
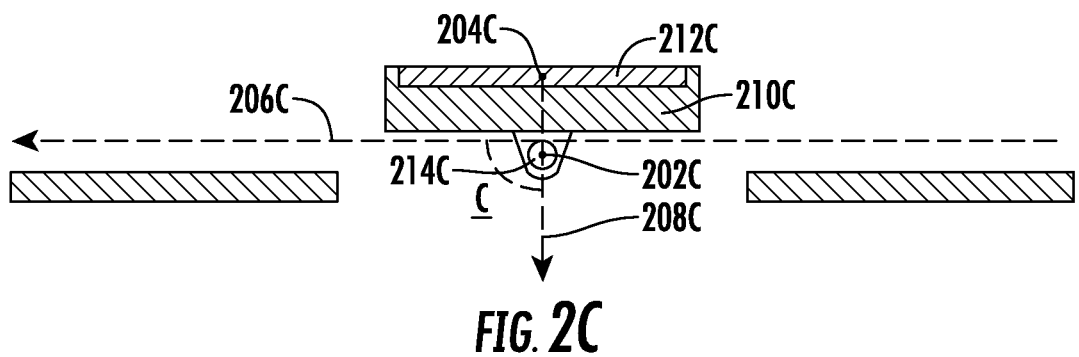
FIG. 2C is an example diagram illustrating an antenna angle associated with an example RFID encoding configuration in accordance with various embodiments of the present disclosure.
Figure 2D:
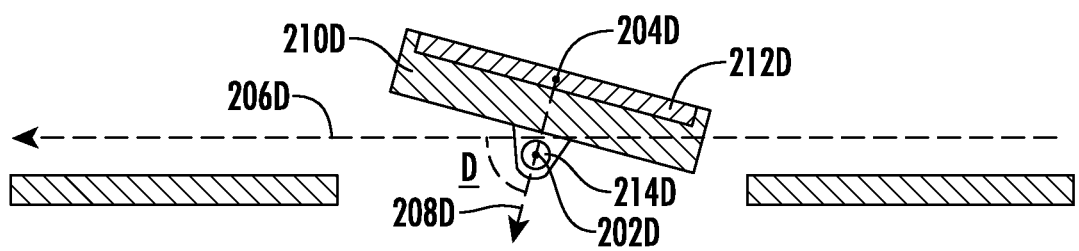
FIG. 2D is an example diagram illustrating an antenna angle associated with an example RFID encoding configuration in accordance with various embodiments of the present disclosure.

FIG. 2C and FIG. 2D illustrate example antenna angles associated with the second example RFID encoding configuration. As described above, when the example rotatable antenna bracket component is in the second example RFID encoding configuration, the example RFID media is below the example RFID antenna component.

In some embodiments, when the example rotatable antenna bracket component is in the second example RFID encoding configuration, a second antenna angle associated with the second example RFID encoding configuration is within a second open interval between 0° to −180°.

For example, in the example shown in FIG. 2C, the RFID media may travel in a travel direction 206C, and the example rotatable antenna bracket component 210C is in the second example RFID encoding configuration so that the RFID media travels below the example RFID antenna component 212C. When the RFID media is below the example RFID antenna component 212C, the example RFID antenna component 212C may transmit RF signals to encode the RFID media. In particular, the encoding direction 208C may be defined by connecting the RFID antenna axis 204C of the example RFID antenna component 212C to the knob portion axis 202C of the first knob portion 214C of the example rotatable antenna bracket component 210C. In the example shown in FIG. 2C, the antenna angle C may be −90°. In some embodiments, the example RFID antenna component 212C may be in a parallel arrangement with the RFID media.

As another example, in the example shown in FIG. 2D, the RFID media may travel in a travel direction 206D, and the example rotatable antenna bracket component 210D is in the second example RFID encoding configuration so that the RFID media travels below the example RFID antenna component 212D. When the RFID media is below the example RFID antenna component 212D, the example RFID antenna component 212D may transmit RF signals to encode the RFID media. In particular, the encoding direction 208D may be defined by connecting the RFID antenna axis 204D of the example RFID antenna component 212D to the knob portion axis 202D of the first knob portion 214D of the example rotatable antenna bracket component 210D. In the example shown in FIG. 2D, the antenna angle D may be a negative acute angle.

While the description above provides examples of antenna angles when the example rotatable antenna bracket component is in the second example RFID encoding configuration, it is noted that the scope of the present disclosure is not limited to the description above. In some examples, an example antenna angle when the example rotatable antenna bracket component is in the second example RFID encoding configuration may be of other values. For example, the example antenna angle when the example rotatable antenna bracket component is in the second example RFID encoding configuration may be a negative obtuse angle.

Referring now to FIG. 3A to FIG. 3E, an example RFID printer 300 in accordance with various embodiments of the present disclosure is illustrated.

Figure 3A:
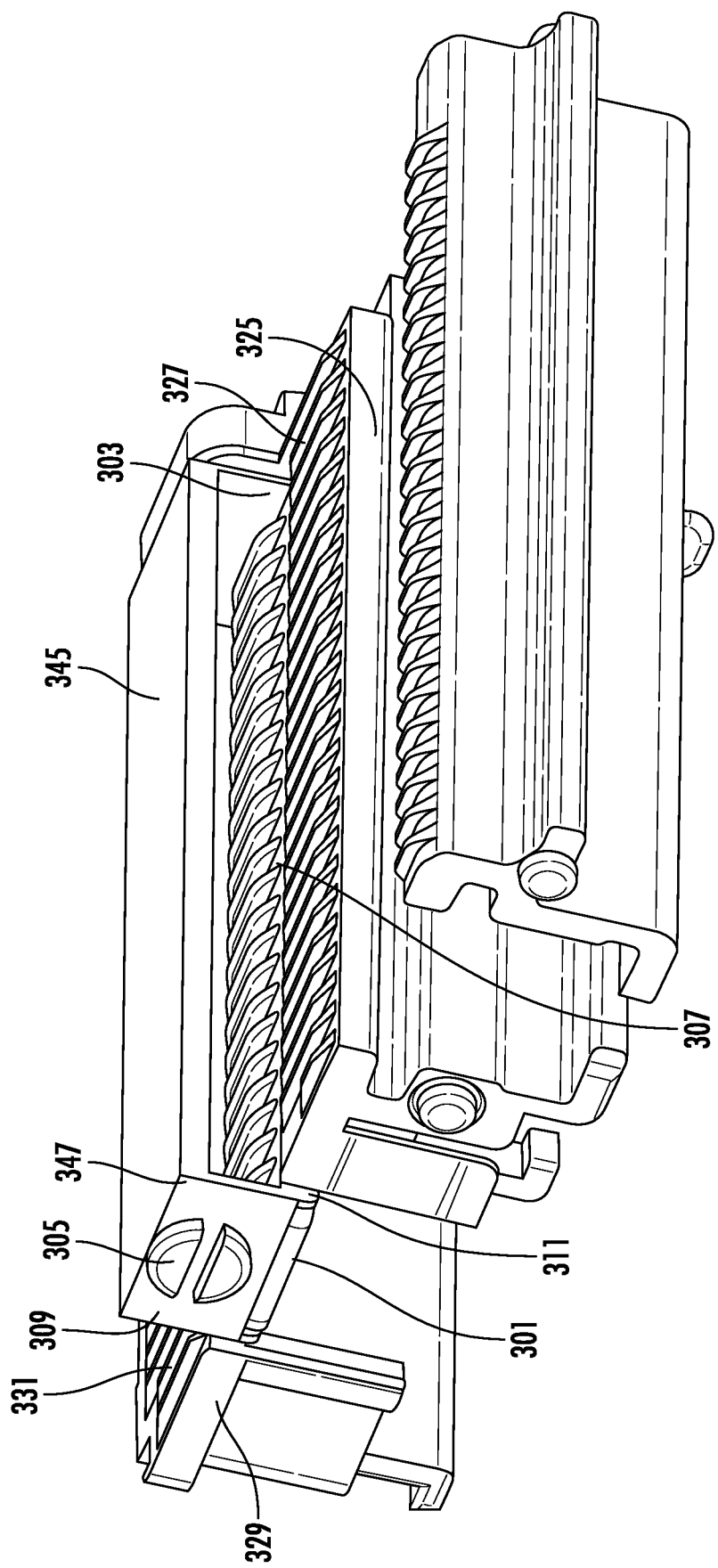
FIG. 3A illustrates an example perspective view of at least a portion of an example RFID printer in accordance with various embodiments of the present disclosure.
Figure 3B:
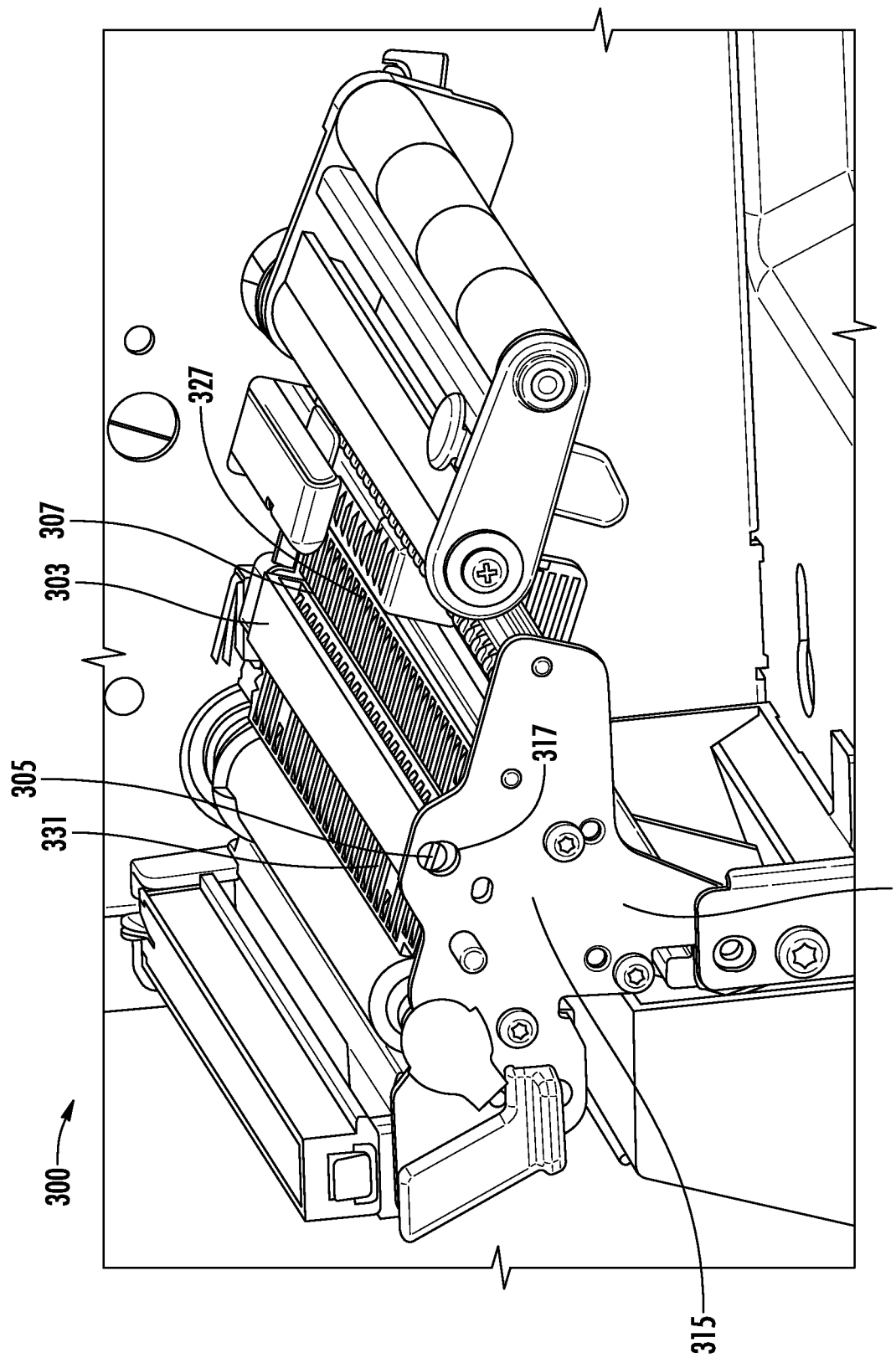
FIG. 3B illustrates another example perspective view of at least a portion of the example RFID printer in accordance with various embodiments of the present disclosure.
Figure 3C:
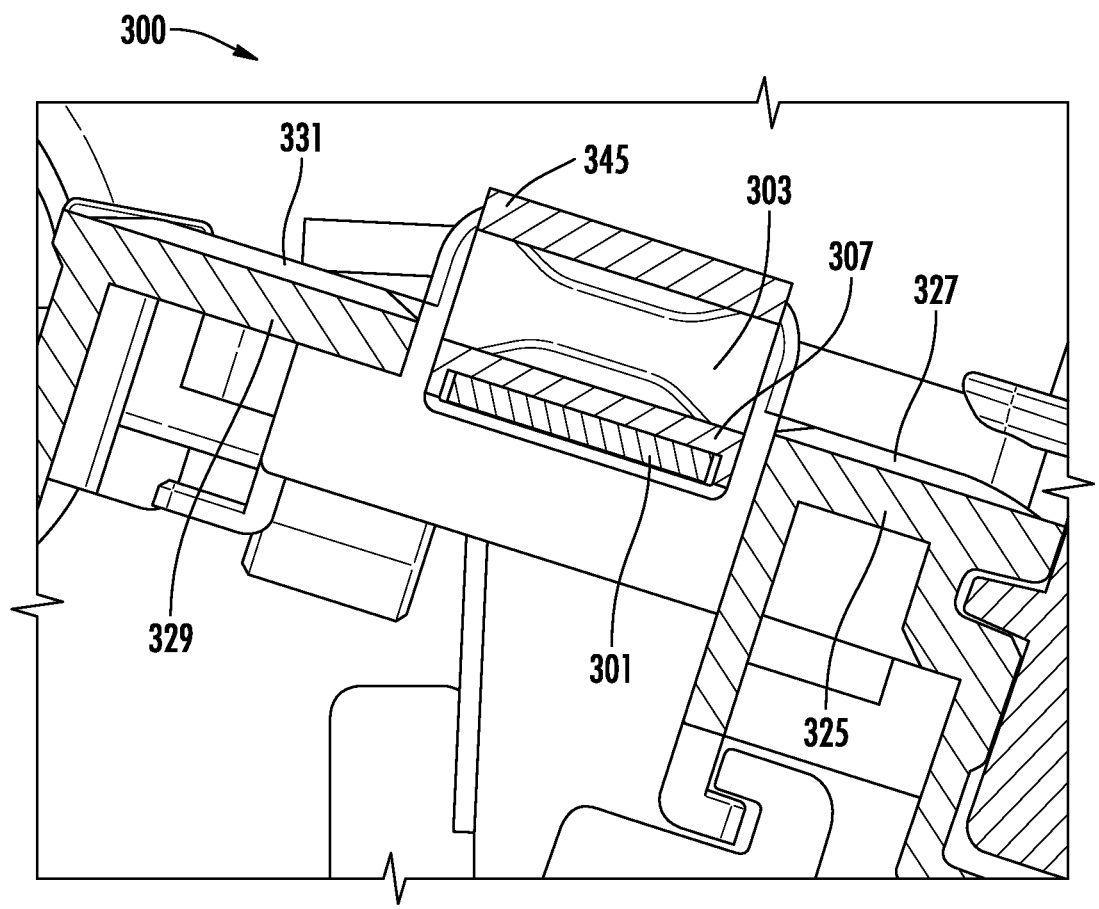
FIG. 3C illustrates an example cross-sectional view of at least a portion of the example RFID printer in accordance with various embodiments of the present disclosure.
Figure 3D:
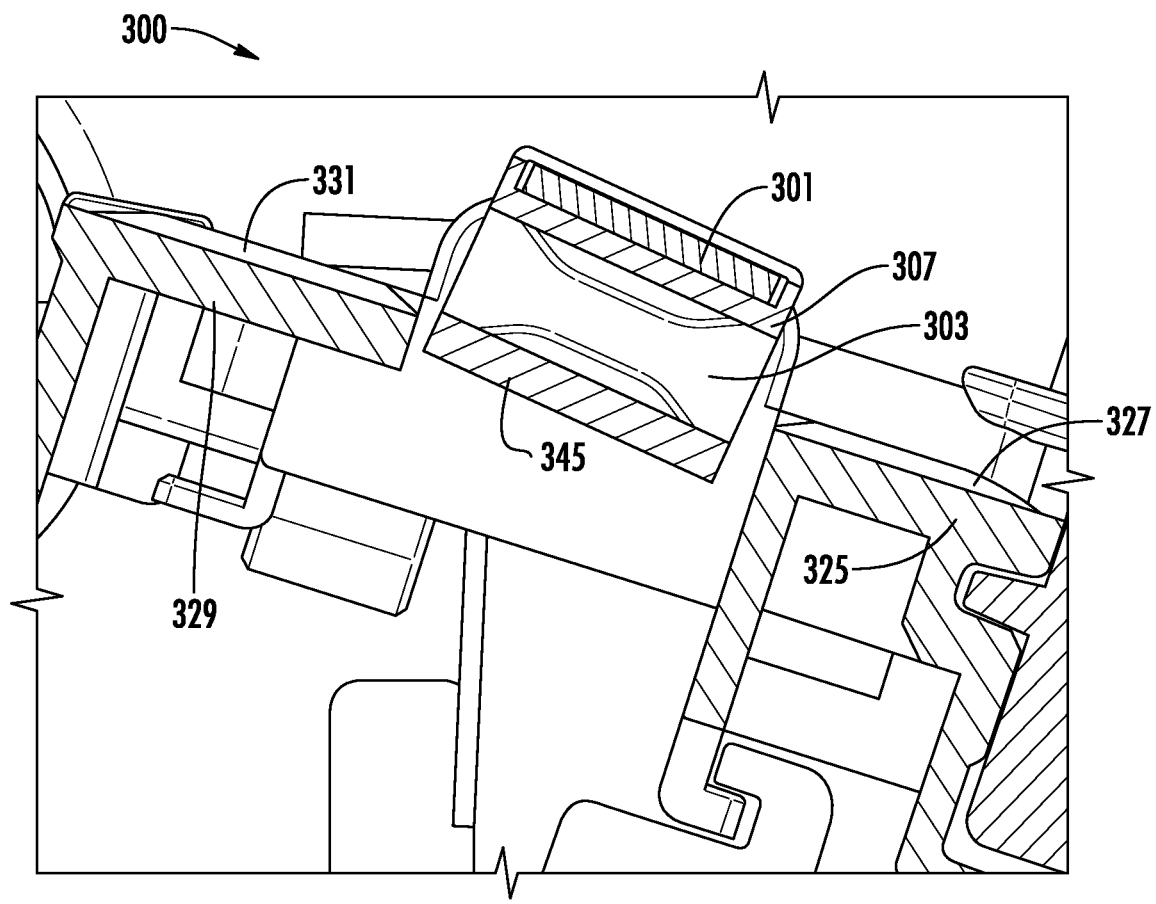
FIG. 3D illustrates another example cross-sectional view of at least a portion of the example RFID printer in accordance with various embodiments of the present disclosure.
Figure 3E:
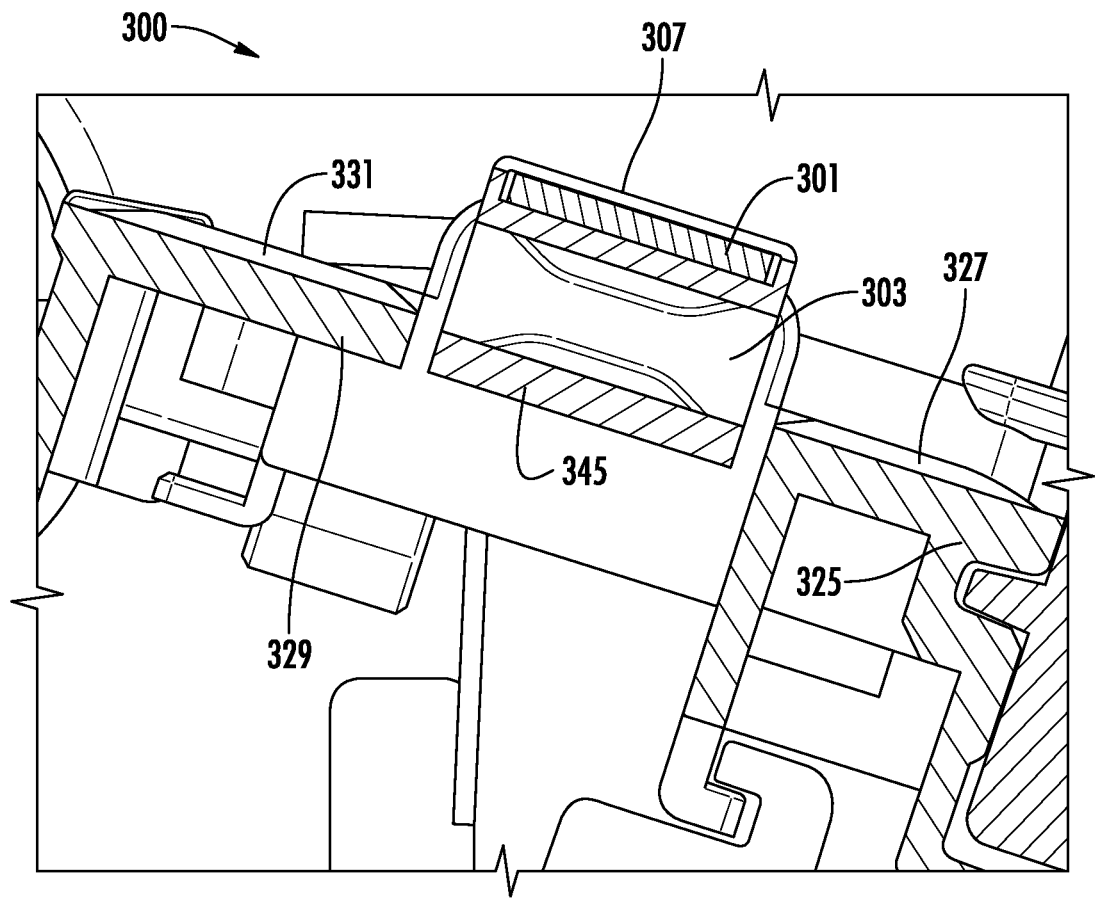
FIG. 3E illustrates another example cross-sectional view of at least a portion of the example RFID printer in accordance with various embodiments of the present disclosure.

In particular, FIG. 3A illustrates an example perspective view of a first media support component 325, an example rotatable antenna bracket component 303, and a second media support component 329 of the example RFID printer 300 in accordance with various embodiments of the present disclosure. FIG. 3B illustrates an example perspective view of at least a portion of the example RFID printer 300 in accordance with various embodiments of the present disclosure. FIG. 3C, FIG. 3D, and FIG. 3E illustrate example cross-sectional views of at least a portion of the example RFID printer 300 in accordance with various embodiments of the present disclosure.

Referring now to FIG. 3A and FIG. 3B, the example RFID printer 300 comprises an example RFID antenna component 301 and an example rotatable antenna bracket component 303.

In some embodiments, the example RFID antenna component 301 is similar to the example RFID antenna component 101 described above in connection with at least FIG. 1A to FIG. 1C.

In some embodiments, the example rotatable antenna bracket component 303 comprises a first elongated portion 307 and a second elongated portion 345. In some embodiments, the example RFID antenna component 301 is secured in the first elongated portion 307 of the example rotatable antenna bracket component 303, similar to those described above in connection with at least FIG. 1A to FIG. 1C. In some embodiments, the second elongated portion 345 of the example rotatable antenna bracket component 303 is devoid of any RFID antenna component. For example, there is no RFID antenna component in the second elongated portion 345 because the rotatable antenna bracket component 303 can rotate the example RFID antenna component 301 to different positions.

In some embodiments, the first elongated portion 307 and the second elongated portion 345 are in a parallel arrangement with one another. For example, the example rotatable antenna bracket component 303 comprises a first side portion 309 that connects a first end 311 of the first elongated portion 307 and a first end 347 of the second elongated portion 345. In some embodiments, the first side portion 309 of the example rotatable antenna bracket component 303 is in a first perpendicular arrangement with the first elongated portion 307 of the example rotatable antenna bracket component 303. For example, an outer surface of the first side portion 309 may be perpendicular to an outer surface of the first elongated portion 307. In some embodiments, the first side portion 309 of the example rotatable antenna bracket component 303 is in a second perpendicular arrangement with the second elongated portion 345 of the example rotatable antenna bracket component 303. For example, an outer surface of the first side portion 309 may be perpendicular to an outer surface of the second elongated portion 345.

In some embodiments, the example rotatable antenna bracket component 303 comprises a first knob portion 305. In some embodiments, the first knob portion 305 may comprise two half-cylinder shape protrusions and may define a gap between the two half-cylinder shape protrusions. The gap may be used to control the rotary position of the first knob portion 305. For example, the head of a flathead screwdriver may be inserted into the gap between the two half-cylinder shape protrusions to rotate the first knob portion 305. Additionally, or alternatively, the first knob portion 305 may be connected to one or more actuators or motors via one or more belts, and the one or more actuators or motors may control the rotary position of the first knob portion 305.

In some embodiments, the first knob portion 305 is disposed on an outer surface of the first side portion 309 of the example rotatable antenna bracket component 303. For example, the first knob portion 305 may protrude from a side surface of the first side portion 309. As such, the first side portion 309 connects a first end 311 of the first elongated portion 307 to the first knob portion 305 of the example rotatable antenna bracket component 303, and connects a first end 347 of the second elongated portion 345 to the first knob portion 305 of the example rotatable antenna bracket component 303.

Referring now to FIG. 3B, the example RFID printer 300 further comprises a printer housing 313. In some embodiments, the printer housing 313 may provide an enclosure or case for some or all components within the printer housing 313. In the example shown in FIG. 3B, only a portion of the printer housing 313 is shown.

In some embodiments, the printer housing 313 comprises a first wall 315. In some embodiments, the first wall 315 defines (e.g. includes) a first knob aperture 317. In some embodiments, the first knob portion 305 of the example rotatable antenna bracket component 303 is positioned within the first knob aperture 317 of the printer housing 313. For example, a diameter of the first knob aperture 317 may equal or be larger than a diameter of the first knob portion 305 so that the first knob portion 305 is disposed within the first knob aperture 317. In some embodiments, the first knob portion 305 is rotatable within the first knob aperture 317.

In some embodiments, similar to those described above in connection with FIG. 1A to FIG. 1C, the example rotatable antenna bracket component 303 comprises a second side portion and a second knob portion.

For example, the second side portion of the example rotatable antenna bracket component 303 connects a second end of the first elongated portion 307 and a second end of the second elongated portion 345. In some embodiments, the second end of the first elongated portion 307 is opposite to the first end 311 of the first elongated portion 307. In some embodiments, the second end of the second elongated portion 345 is opposite to the first end 347 of the second elongated portion 345. In some embodiments, the second side portion of the example rotatable antenna bracket component 303 is in a first perpendicular arrangement with the first elongated portion 307, and is in a second perpendicular arrangement with the second elongated portion 345.

In some embodiments, the second knob portion is shaped and/or positioned similar to those of the first knob portion 305 described above. For example, the second knob portion is disposed on an outer surface of the second side portion. In some embodiments, the second side portion connects the second end of the first elongated portion 307 to the second knob portion of the example rotatable antenna bracket component 303. In some embodiments, the second side portion connects the second end of the second elongated portion 345 to the second knob portion of the example rotatable antenna bracket component 303.

In the examples shown in FIG. 3A and FIG. 3B, the example RFID printer 300 further comprises a first media support component 325, similar to the first media support component 125 described above in connection with at least FIG. 1A to FIG. 1C. For example, the first media support component 325 is positioned adjacent to the example rotatable antenna bracket component 303 and comprises a first media support surface 327.

In the examples shown in FIG. 3A and FIG. 3B, the example RFID printer 300 further comprises a second media support component 329, similar to the second media support component 129 described above in connection with at least FIG. 1A to FIG. 1C. For example, the second media support component 329 comprises a second media support surface 331, and the example rotatable antenna bracket component 303 is positioned between the first media support component 325 and the second media support component 329, similar to those described above in connection with at least FIG. 1A to FIG. 1C. In some embodiments, the first media support component 325 and the second media support component 329 are connected via a connection bridge component, and the connection bridge component defines a second knob aperture, similar to those described above. In some embodiments, the second knob portion is positioned within the second knob aperture, similar to those described above.

In some embodiments, when an example RFID media travels in a printing direction, the example RFID media travels on the first media support surface 327 of the first media support component 325, and then between the first elongated portion 307 and the second elongated portion 345 of the example rotatable antenna bracket component 303, and then on the second media support surface 331 of the second media support component 329.

In some embodiments, the example rotatable antenna bracket component 303 is configured to provide a plurality of example RFID encoding configurations based on a plurality of rotary positions of the first knob portion 305 (and/or the second knob portion described above).

Referring now to FIG. 3C to FIG. 3E, example cross-sectional views of the example rotatable antenna bracket component 303, the first media support component 325, and the second media support component 329 are illustrated. In particular, the example cross-sectional views illustrated in FIG. 3C to FIG. 3E are based on a cut line along the printing direction and viewing from a side of the example components shown in FIG. 3A.

In some embodiments, the plurality of example RFID encoding configurations comprises a first example RFID encoding configuration and a second example RFID encoding configuration.

In some embodiments, when the example rotatable antenna bracket component 303 is in the first example RFID encoding configuration, the example RFID media is top of the first elongated portion 307 and under the second elongated portion 345.

Referring now to FIG. 3C, an example of the first example RFID encoding configuration is illustrated. In this example, when the example rotatable antenna bracket component 303 is in the first example RFID encoding configuration, the example RFID media is on top of the first elongated portion 307 and under the second elongated portion 345. For example, the RFID media travels on the first media support surface 327 of the first media support component 325, then on top of the first elongated portion 307 and under the second elongated portion 345, and then on the second media support surface 331 of the second media support component 329. As described above, the example RFID antenna component 301 is secured in the first elongated portion 307, and the second elongated portion 345 is devoid of any RFID antenna component. As such, when the example rotatable antenna bracket component 303 is in the first example RFID encoding configuration, the example RFID antenna component 301 may encode the RFID media from the bottom of the RFID media. In some embodiments, the first example RFID encoding configuration may be implemented to encode digital data to an RFID media that does not include a shielding layer at the bottom of the RFID media (e.g. not an anti-metal RFID tag).

In some embodiments, when the example rotatable antenna bracket component 303 is in the second example RFID encoding configuration, the example RFID media is under the first elongated portion 307 and on top of the second elongated portion 345.

Referring now to FIG. 3E, an example of the second example RFID encoding configuration is illustrated. In this example, when the example rotatable antenna bracket component 303 is in the second example RFID encoding configuration, the example RFID media is under the first elongated portion 307 and on top of the second elongated portion 345. For example, the RFID media travels on the first media support surface 327 of the first media support component 325, then on top of the second elongated portion 345 and under the first elongated portion 307, and then on the second media support surface 331 of the second media support component 329. As described above, the example RFID antenna component 301 is secured in the first elongated portion 307, and the second elongated portion 345 is devoid of any RFID antenna component. As such, when the example rotatable antenna bracket component 303 is in the second example RFID encoding configuration, the example RFID antenna component 301 may encode the RFID media from the top of the RFID media. In some embodiments, the second example RFID encoding configuration may be implemented to encode digital data to an RFID media that includes a shielding layer at the bottom of the RFID media (e.g. an anti-metal RFID tag).

In some embodiments, each of the plurality of RFID encoding configurations is associated with a corresponding antenna angle, similar to those described in connection with at least FIG. 1A to FIG. 2D. For example, FIG. 3D illustrates an example where the example RFID antenna component 301 is rotated to an antenna angle for encoding the RFID media.

In accordance with various embodiments of the present disclosure, an example RFID printer may comprise one or more processing circuitries. For example, FIG. 4 illustrates an example block diagram of an example RFID printer 400 in accordance with various example embodiments of the present disclosure.

Figure 4:
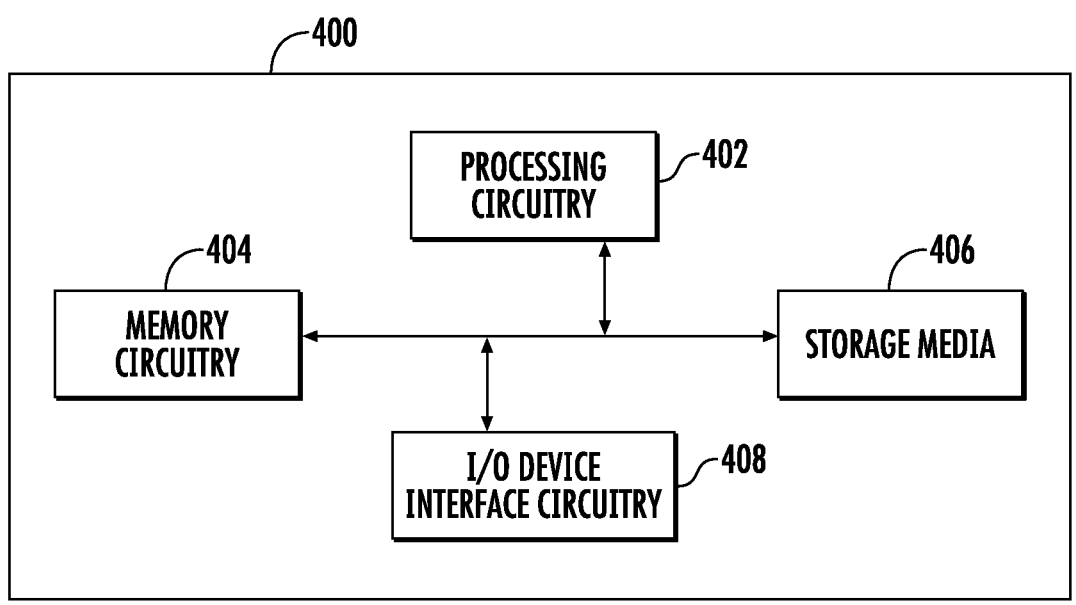
FIG. 4 illustrates an example block diagram illustrating example components of an example RFID printer in accordance with various embodiments of the present disclosure.

In the example shown in FIG. 4, the example RFID printer 400 includes a processing circuitry 402, a memory circuitry 404, a storage media 406 and an Input/Output (I/O) device interface circuitry 408.

In some embodiments, the processing circuitry 402 may be embodied as means including one or more microprocessors with accompanying digital signal processor(s), one or more processor(s) without an accompanying digital signal processor, one or more coprocessors, one or more multicore processors, one or more controllers, processors, one or more computers, various other processing elements including integrated circuits such as, for example, an application specific integrated circuit (ASIC), programmable logic controller (PLC) or field programmable gate array (FPGA), or some combination thereof. Accordingly, although illustrated in FIG. 4 as a single processor, in an embodiment, the processing circuitry 402 may include a plurality of processors and signal processing modules. The plurality of processors may be in operative communication with each other and may be collectively configured to perform one or more functionalities of the circuitry of the example RFID printer 400, as described herein. In an example embodiment, the processing circuitry 402 may be configured to execute instructions stored in the memory circuitry 404 or otherwise accessible to the processing circuitry 402.

Whether configured by hardware, firmware/software methods, or by a combination thereof, the processing circuitry 402 may include an entity capable of performing operations according to embodiments of the present disclosure while configured accordingly. Thus, for example, when the processing circuitry 402 is embodied as an ASIC, PLC, FPGA or the like, the processing circuitry 402 may include specifically configured hardware for conducting one or more operations described herein. Alternatively, as another example, when the processing circuitry 402 is embodied as an executor of instructions, such as may be stored in the memory circuitry 404, the instructions may specifically configure the processing circuitry 402 to perform one or more algorithms and operations described herein.

Thus, the processing circuitry 402 used herein may refer to a programmable microprocessor, microcomputer or multiple processor chip or chips that can be configured by software instructions (applications) to perform a variety of functions, including the functions of the various embodiments described above.

In some embodiments, the memory circuitry 404 may include suitable logic, circuitry, and/or interfaces that are adapted to store a set of instructions that is executable by the processing circuitry 402 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the memory circuitry 404 may be integrated with the processing circuitry 402 on a single chip, without departing from the scope of the disclosure.

In some embodiments, the storage media 406 may be embodied as a data storage device or devices, as a separate database server or servers, or as a combination of data storage devices and separate database servers. For example, the storage media 406 may include hard disks, ROM, EPROM, flash memory, SD memory cards, Memory Sticks, and/or the like. In some embodiments, the storage media 406 may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to may refer to a structured or unstructured collection of information/data that is stored in a computer-readable storage medium.

In some embodiments, the I/O device interface circuitry 408 may include suitable logic and/or circuitry that may be configured to communicate with the one or more components of the example RFID printer 400, in accordance with one or more device communication protocols such as, without limitation, I2C communication protocol, Serial Peripheral Interface (SPI) communication protocol, Serial communication protocol, Control Area Network (CAN) communication protocol, and 1-Wire® communication protocol. In an example embodiment, the I/O device interface circuitry 408 may communicate with components such as, but not limited to, one or more actuators and/or motors that control the rotation of an example rotatable antenna bracket component of the example RFID printer 400, one or more circuitries of the RFID antenna component that detects the signal strength from the RFID media, and/or the like.

Figure 5:
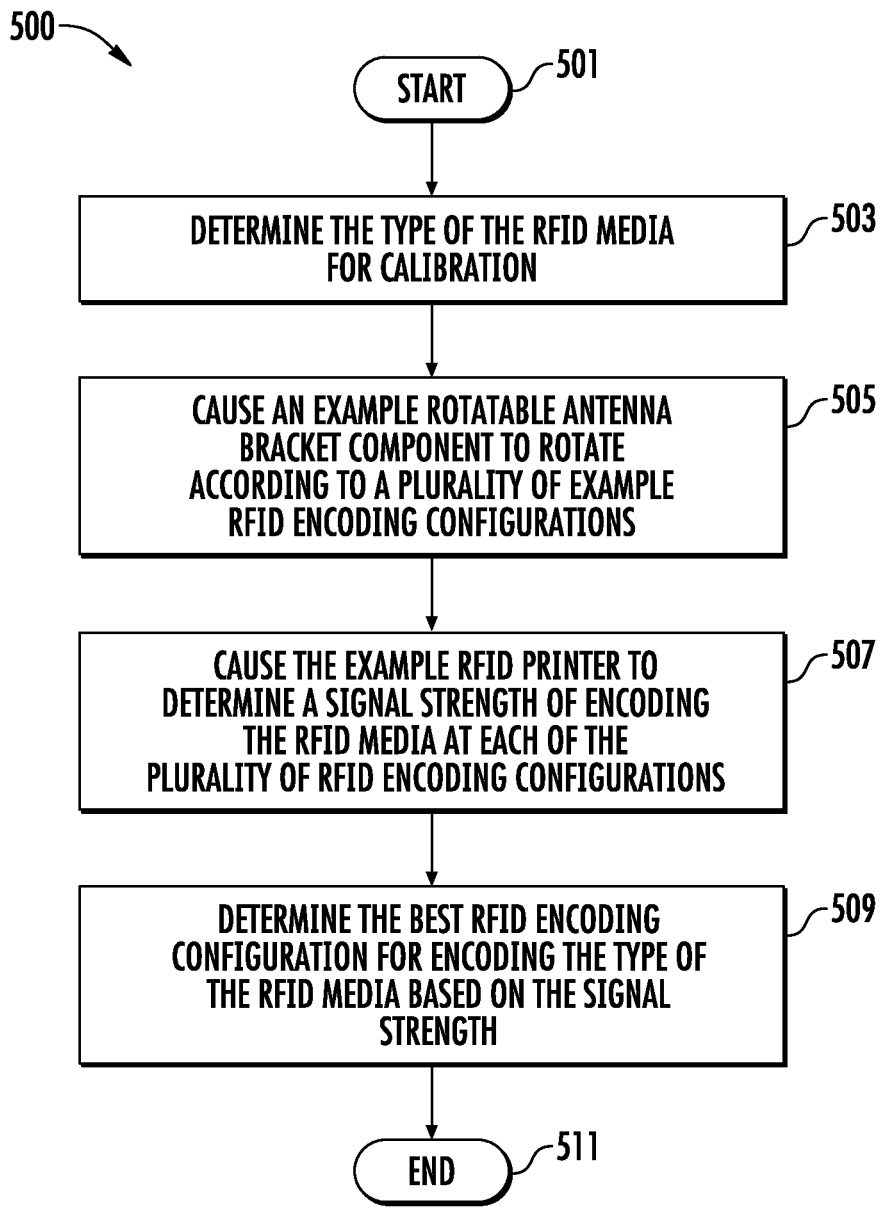
FIG. 5 illustrates an example method of calibrating the RFID encoding configuration for a type of the RFID media in accordance with various embodiments of the present disclosure.
Figure 6:
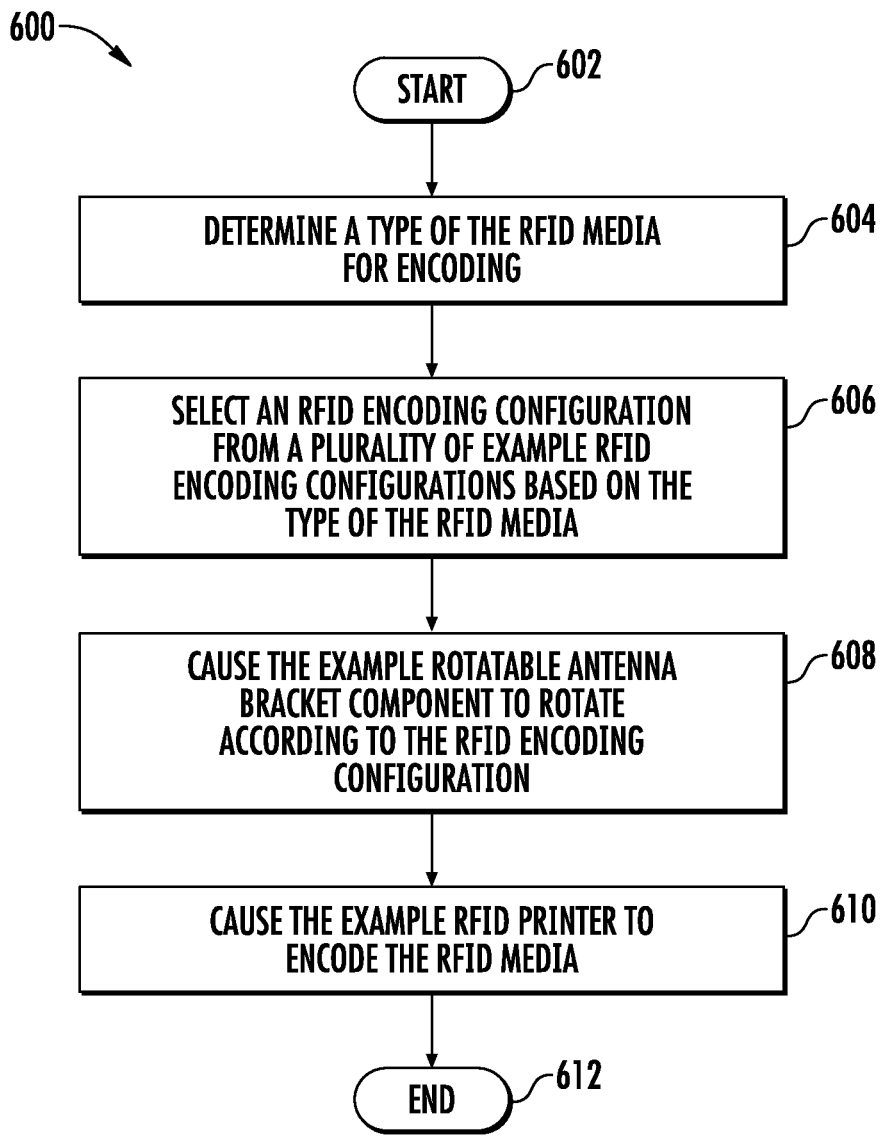
FIG. 6 illustrates an example method of selecting an RFID encoding configuration based on a type of the RFID media in accordance with various embodiments of the present disclosure.

Referring now to FIG. 5 and FIG. 6, example diagrams illustrating example methods in accordance with various embodiments of the present disclosure are illustrated.

It is noted that each block of the flowchart, and combinations of blocks in the flowchart, may be implemented by various means such as hardware, firmware, circuitry and/or other devices associated with execution of software including one or more computer program instructions. For example, one or more of the steps/operations described in FIG. 5 and FIG. 6 may be embodied by computer program instructions, which may be stored by a non-transitory memory of an apparatus (such as an example RFID printer) employing an embodiment of the present disclosure and executed by a processing circuitry in the apparatus (such as the example RFID printer). For example, these computer program instructions may direct the example RFID printer apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Referring now to FIG. 5, an example method 500 is illustrated. In particular, the example method 500 illustrates example steps/operations of calibrating an RFID printer by determining the best RFID encoding configuration for encoding a type of the RFID media in accordance with various embodiments of the present disclosure. For example, the example method 500 may include determining a type of the RFID media for calibration, causing an example rotatable antenna bracket component to rotate according to a plurality of example RFID encoding configurations, causing the example RFID printer to determine a signal strength for encoding the RFID media at each of the plurality of example RFID encoding configurations, and determining the best RFID encoding configuration for encoding the type of the RFID media based on the signal strength.

Referring now to FIG. 5, the example method 500 starts at step/operation 501. In some embodiments, subsequent to and/or in response to step/operation 501, the example method 500 proceeds to step/operation 503. At step/operation 503, a processing circuitry (such as, but not limited to, the processing circuitry 402 of the RFID printer 400 described in connection with FIG. 4 above) may determine a type of the RFID media for calibration.

For example, when an example RFID printer receives an RFID media, the RFID antenna component may initiate read operations (such as, but not limited to, by transmitting RF signals, similar to those described above) to interrogate the RFID media, and the RFID media may transmit RF signals back to the RFID antenna component that indicate a type of the RFID media.

Additionally, or alternatively, the example RFID printer may receive an indication of the type of the RFID media. For example, the example RFID printer may receive an indication in the form of a user input that indicates the type of RFID media. Additionally, or alternatively, the example RFID printer may determine the type of the RFID media through other ways.

As described above, example types of the RFID media include, but are not limited to, anti-metal tags, normal tags, and/or the like.

Referring back to FIG. 5, subsequent to step/operation 503, the example method 500 proceeds to step/operation 505. At step/operation 505, the processing circuitry (such as, but not limited to, the processing circuitry 402 of the RFID printer 400 described in connection with FIG. 4 above) may cause an example rotatable antenna bracket component to rotate according to a plurality of example RFID encoding configurations.

In some embodiments, the processing circuitry may transmit instructions to one or more actuators and/or motors that are connected to a knob portion of the example rotatable antenna bracket component, and the one or more actuators and/or motors may cause the knob portion of the example rotatable antenna bracket component to rotate upon receiving the instructions. Additionally, or alternatively, the processing circuitry may cause instructions to rotate the knob portion to be rendered on a user interface (for example, a display on the RFID printer), and a user may rotate the knob portion based on the instructions.

As described above, each of the plurality of example RFID encoding configurations may be associated with a corresponding antenna angle, and the example antenna component may encode the RFID media at different antenna angles. For example, in one RFID encoding configuration, the example antenna component may encode the RFID media from the top of the RFID media; in another encoding configuration, the example antenna component may encode the RFID media from the bottom of the RFID media, similar to those described above.

Referring back to FIG. 5, subsequent to step/operation 505, the example method 500 proceeds to step/operation 507. At step/operation 507, the processing circuitry (such as, but not limited to, the processing circuitry 402 of the RFID printer 400 described in connection with FIG. 4 above) may cause the example RFID printer to determine a signal strength for encoding the RFID media at each of the plurality of example RFID encoding configurations.

For example, when the example antenna component encodes the RFID media at an antenna angle, the example antenna component may transmit an RF signal to the RFID media, and receive an RF signal from the RFID media in response. In some embodiments, the processing circuitry may determine a signal strength (for example, based on the amplitude of the RF signal) associated with the antenna angle. In some embodiments, if the example antenna component does not receive any RF signal in response, the processing circuitry may determine a signal strength associated with the antenna angle to be zero.

Referring back to FIG. 5, subsequent to step/operation 507, the example method 500 proceeds to step/operation 509. At step/operation 509, the processing circuitry (such as, but not limited to, the processing circuitry 402 of the RFID printer 400 described in connection with FIG. 4 above) may determine the best RFID encoding configuration for encoding the type of the RFID media based on the signal strength.

For example, the processing circuitry may determine the highest value of the signal strength from values of signal strength determined at step/operation 507. The processing circuitry may determine the RFID encoding configuration that corresponds to the signal strength having the highest value, and may determine such RFID encoding configuration as the best RFID encoding configuration for encoding the type of the RFID media.

In some embodiments, the processing circuitry may store data and/or information indicating the best RFID encoding configuration for each of a plurality of types of the RFID media in a data storage device (such as, but not limited to, the storage media 406 described above in connection with FIG. 4).

Referring back to FIG. 5, subsequent to step/operation 509, the example method 500 proceeds to step/operation 511 and ends.

Referring now to FIG. 6, an example method 600 is illustrated. In particular, the example method 600 illustrates example steps/operations of selecting an RFID encoding configuration based on a type of the RFID media in accordance with various embodiments of the present disclosure. For example, the example method 600 may include determining a type of the RFID media for encoding, selecting an RFID encoding configuration from a plurality of example RFID encoding configurations based on the type of the RFID media, causing the example rotatable antenna bracket component to rotate according to the RFID encoding configuration, and causing the example RFID printer to encode the RFID media.

Referring now to FIG. 6, the example method 600 starts at step/operation 602. In some embodiments, subsequent to and/or in response to step/operation 602, the example method 600 proceeds to step/operation 604. At step/operation 604, a processing circuitry (such as, but not limited to, the processing circuitry 402 of the RFID printer 400 described in connection with FIG. 4 above) may determine a type of the RFID media for encoding.

For example, similar to those described above in connection with at least step/operation 503 of FIG. 5, the example RFID printer may determine the type of RFID media based at least in part on RF signals received from RFID media and/or an indication of the type of RFID media. Example types of the RFID media include, but are not limited to, anti-metal tags, normal tags, and/or the like, similar to those described above.

Referring back to FIG. 6, subsequent to and/or in response to step/operation 604, the example method 600 proceeds to step/operation 606. At step/operation 606, a processing circuitry (such as, but not limited to, the processing circuitry 402 of the RFID printer 400 described in connection with FIG. 4 above) may select an RFID encoding configuration from a plurality of example RFID encoding configurations based on the type of the RFID media.

As described above in connection with at least FIG. 5, the processing circuitry may store data and/or information indicating the best RFID encoding configuration for each of a plurality of types of the RFID media in a data storage device (such as, but not limited to, the storage media 406 described above in connection with FIG. 4). As step/operation 606, the processing circuitry may retrieve data and/or information from the data storage device, and determine the best RFID encoding configuration from the plurality of example RFID encoding configurations based at least in part on the RFID media type determined at step/operation 604. For example, the processing circuitry may select an RFID encoding configuration where the value of the signal strength is the highest, as described above.

Referring back to FIG. 6, subsequent to and/or in response to step/operation 606, the example method 600 proceeds to step/operation 608. At step/operation 608, a processing circuitry (such as, but not limited to, the processing circuitry 402 of the RFID printer 400 described in connection with FIG. 4 above) may cause the example rotatable antenna bracket component to rotate according to the RFID encoding configuration.

In some embodiments, the processing circuitry may generate instructions based on the RFID encoding configuration selected at step/operation 606. For example, the instructions may include an indication of antenna angle according to the RFID encoding configuration selected at step/operation 606. In some embodiments, the antenna angle defines the rotation angle of the example RFID antenna component.

In some embodiments, the processing circuitry may transmit instructions to one or more actuators and/or motors that are connected to a knob portion of the example rotatable antenna bracket component, and the one or more actuators and/or motors may cause the knob portion of the example rotatable antenna bracket component to rotate according to the RFID encoding configuration selected at step/operation 606. Additionally, or alternatively, the processing circuitry may cause instructions to rotate the knob portion to be rendered on a user interface (for example, a display on the RFID printer), and a user may rotate the knob portion based on the instructions.

Referring back to FIG. 6, subsequent to and/or in response to step/operation 608, the example method 600 proceeds to step/operation 610. At step/operation 610, a processing circuitry (such as, but not limited to, the processing circuitry 402 of the RFID printer 400 described in connection with FIG. 4 above) may cause the example RFID printer to encode the RFID media.

For example, the example antenna component may transmit an RF signal to the RFID media at the antenna angle according to the RFID encoding configuration to encode the RFID media. As described above, the antenna angle may be determined based on the RFID media type. For example, if the RFID media is an anti-metal RFID tag, the RFID antenna component may be rotated to be positioned above the RFID media so that the RFID antenna component encodes the RFID media from the top of the RFID media. As another example, if the RFID media is a normal RFID tag, the RFID antenna component may be rotated to be positioned below the RFID media so that the RFID antenna component encodes the RFID media from the bottom of the RFID media. As another example, the RFID antenna component may be rotated to a position where the strength of the signal for the RFID media is the highest for encoding the RFID media.

As described above, the RFID printer may embed digital data (such as, but not limited to, the unique tag ID number) in the RF signal. Upon receiving the RF signal, the IC in the RFID inlay of the RFID tag may store the digital data (such as, but not limited to, the unique tag ID number) in the memory circuitry of the IC.

Referring back to FIG. 6, subsequent to and/or in response to step/operation 610, the example method 600 proceeds to step/operation 612 and ends.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

What is claimed is:

1. A radio-frequency identification (RFID) printer, comprising:
    an RFID antenna component; and
    a rotatable antenna bracket component comprising:
        a first knob portion defining a knob portion axis,
        a first elongated portion, wherein the RFID antenna component is secured in the first elongated portion, and
        a first side portion projecting from a first end of the first elongated portion and connecting the first elongated portion to the first knob portion,
    wherein the rotatable antenna bracket component is configured to rotate around the knob portion axis parallel to a roller axis of a roller of the RFID printer to provide a plurality of RFID encoding configurations based on a plurality of rotary positions of the first knob portion.

2. The RFID printer of claim 1, wherein the first side portion is in a first perpendicular arrangement with the first elongated portion.

3. The RFID printer of claim 1, further comprising:
    a printer housing comprising a first wall defining a first knob aperture, wherein the first knob portion of the rotatable antenna bracket component is positioned within the first knob aperture and is rotatable within the first knob aperture.

4. The RFID printer of claim 3, wherein the rotatable antenna bracket component comprises:
    a second knob portion; and
    a second side portion projecting from a second end of the first elongated portion and connecting the first elongated portion to the second knob portion, wherein the second end of the first elongated portion is opposite to the first end of the first elongated portion.

5. The RFID printer of claim 4, further comprising:
    a first media support component comprising a first media support surface, wherein the first media support component is positioned adjacent to the rotatable antenna bracket component, wherein an RFID media travels on the first media support surface in a printing direction.

6. The RFID printer of claim 5, further comprising:
a second media support component comprising a second media support surface, wherein the second media support component is connected to the first media support component via a connection bridge component, wherein the rotatable antenna bracket component is positioned between the first media support component and the second media support component.

7. The RFID printer of claim 6, wherein the connection bridge component defines a second knob aperture, wherein the second knob portion of the rotatable antenna bracket component is positioned within the second knob aperture and is rotatable within the second knob aperture.

8. The RFID printer of claim 1, wherein the plurality of RFID encoding configurations comprises a first RFID encoding configuration and a second RFID encoding configuration, wherein:
when the rotatable antenna bracket component is in the first RFID encoding configuration, an RFID media travels above the RFID antenna component; and
when the rotatable antenna bracket component is in the second RFID encoding configuration, the RFID media travels below the RFID antenna component.

9. The RFID printer of claim 8, wherein the first elongated portion comprises:
a first elongated surface, wherein the RFID antenna component is secured on the first elongated surface; and
a second elongated surface opposite to the first elongated surface.

10. The RFID printer of claim 9, wherein, when the rotatable antenna bracket component is in the first RFID encoding configuration, the RFID media travels above the second elongated surface of the first elongated portion.

11. The RFID printer of claim 10, wherein, when the rotatable antenna bracket component is in the second RFID encoding configuration, the RFID media travels below the second elongated surface of the first elongated portion.

12. The RFID printer of claim 8, wherein the RFID antenna component defines a RFID antenna axis, wherein the RFID antenna axis and the knob portion axis define an encoding direction for the RFID antenna component to encode the RFID media, wherein each of the plurality of RFID encoding configurations is associated with a corresponding antenna angle that is between a printing direction of the RFID media and the encoding direction.

13. The RFID printer of claim 12, wherein a first antenna angle associated with the first RFID encoding configuration is within a first open interval between 0° to 180°, wherein a second antenna angle associated with the second RFID encoding configuration is within a second open interval between 0° to −180°.

14. The RFID printer of claim 1, wherein the rotatable antenna bracket component comprises a second elongated portion, wherein the first side portion connects a first end of the second elongated portion to the first knob portion.

15. The RFID printer of claim 14, wherein the second elongated portion is devoid of any RFID antenna component.

16. The RFID printer of claim 14, wherein the first side portion is in a second perpendicular arrangement with the second elongated portion.

17. The RFID printer of claim 14, wherein the rotatable antenna bracket component comprises:
a second knob portion; and
a second side portion connecting a second end of the second elongated portion to the second knob portion, wherein the second end of the first elongated portion is opposite to the first end of the second elongated portion.

18. The RFID printer of claim 14 further comprising:
a first media support component positioned adjacent to the rotatable antenna bracket component and comprising a first media support surface, wherein a RFID media travels on the first media support surface and between the first elongated portion and the second elongated portion in a printing direction.

19. The RFID printer of claim 18, wherein the plurality of RFID encoding configurations comprises a first RFID encoding configuration and a second RFID encoding configuration, wherein:
when the rotatable antenna bracket component is in the first RFID encoding configuration, the RFID media travels on top of the first elongated portion and under the second elongated portion; and
when the rotatable antenna bracket component is in the second RFID encoding configuration, the RFID media travels under the first elongated portion and on top of the second elongated portion.

* * * * *